United States Patent [19]
Kaneda et al.

[11] Patent Number: 5,438,190
[45] Date of Patent: Aug. 1, 1995

[54] LENS CONTROL DEVICE

[75] Inventors: Naoya Kaneda, Chigasaki; Masahide Hirasawa, Sagamihara; Kunihiko Yamada, Tanashi; Kitahiro Kaneda; Mitsuo Niida, both of Yokohama, all of Japan

[73] Assignee: Canon Kabushiki Kaisha, Tokyo, Japan

[21] Appl. No.: 287,707

[22] Filed: Aug. 9, 1994

Related U.S. Application Data

[63] Continuation of Ser. No. 164,617, Dec. 9, 1993, abandoned, which is a continuation of Ser. No. 82,260, Jun. 24, 1993, abandoned, which is a continuation of Ser. No. 917,166, Jul. 20, 1992, abandoned.

[30] Foreign Application Priority Data

Jul. 22, 1991 [JP] Japan .................. 3-180975
Jul. 26, 1991 [JP] Japan .................. 3-187658

[51] Int. Cl.⁶ ............................................ G01J 1/20
[52] U.S. Cl. ............................. 250/201.3; 359/698
[58] Field of Search ............... 250/201.2, 201.4, 201.6, 250/201.8, 201.7; 359/696–698; 354/402

[56] References Cited

U.S. PATENT DOCUMENTS

| | | | |
|---|---|---|---|
| 4,043,642 | 8/1977 | Hirose et al. | 359/697 |
| 4,735,494 | 4/1988 | Makino et al. | 359/698 |
| 4,896,179 | 1/1990 | Watanabe et al. | 354/195.1 |
| 4,920,369 | 4/1990 | Kaneda et al. | 354/400 |
| 4,935,763 | 6/1990 | Itob et al. | 354/400 |
| 4,950,054 | 8/1990 | Wada et al. | 350/429 |
| 4,991,944 | 2/1991 | Hirao et al. | 350/429 |
| 5,060,001 | 10/1991 | Kaneda | 359/698 |
| 5,144,491 | 9/1992 | Ushiro et al. | 359/698 |
| 5,159,370 | 10/1992 | Takahashi | 359/696 |
| 5,164,756 | 11/1992 | Hirasawa | 350/400 |
| 5,287,223 | 2/1994 | Hirasawa | 359/697 |

FOREIGN PATENT DOCUMENTS

| | | | |
|---|---|---|---|
| 0289516 | 11/1988 | Japan | 359/698 |
| 0073320 | 3/1990 | Japan | 359/698 |
| 0253218 | 10/1990 | Japan | 359/698 |
| 0109513 | 5/1991 | Japan | 359/698 |

*Primary Examiner*—David C. Nelms
*Attorney, Agent, or Firm*—Robin, Blecker, Daley & Driscoll

[57] ABSTRACT

An automatic focus adjusting device in a camera system includes a focus detecting circuit for a focusing state of an object image formed on an image plane by a photographic lens, a control circuit for producing a control signal on the basis of an output of the focus detecting circuit and for outputting the control signal to the photographic lens to control the same, and a characteristic detecting circuit for detecting a predetermined optical characteristic of the photographic lens. The control circuit is arranged to transmit the control signal to the photographic lens by defining as a parameter a change of the optical characteristic detected by the characteristic detecting circuit.

69 Claims, 13 Drawing Sheets

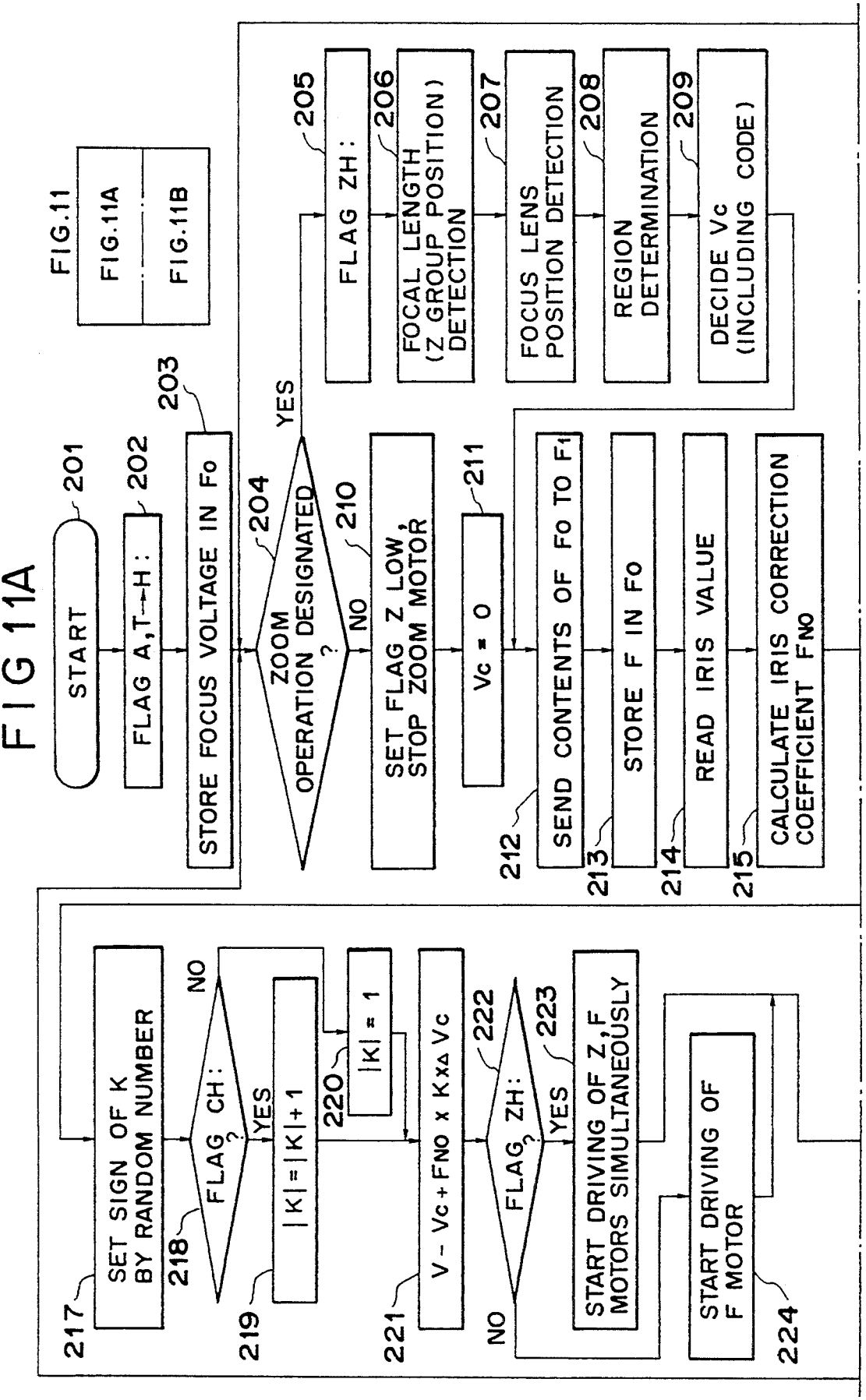

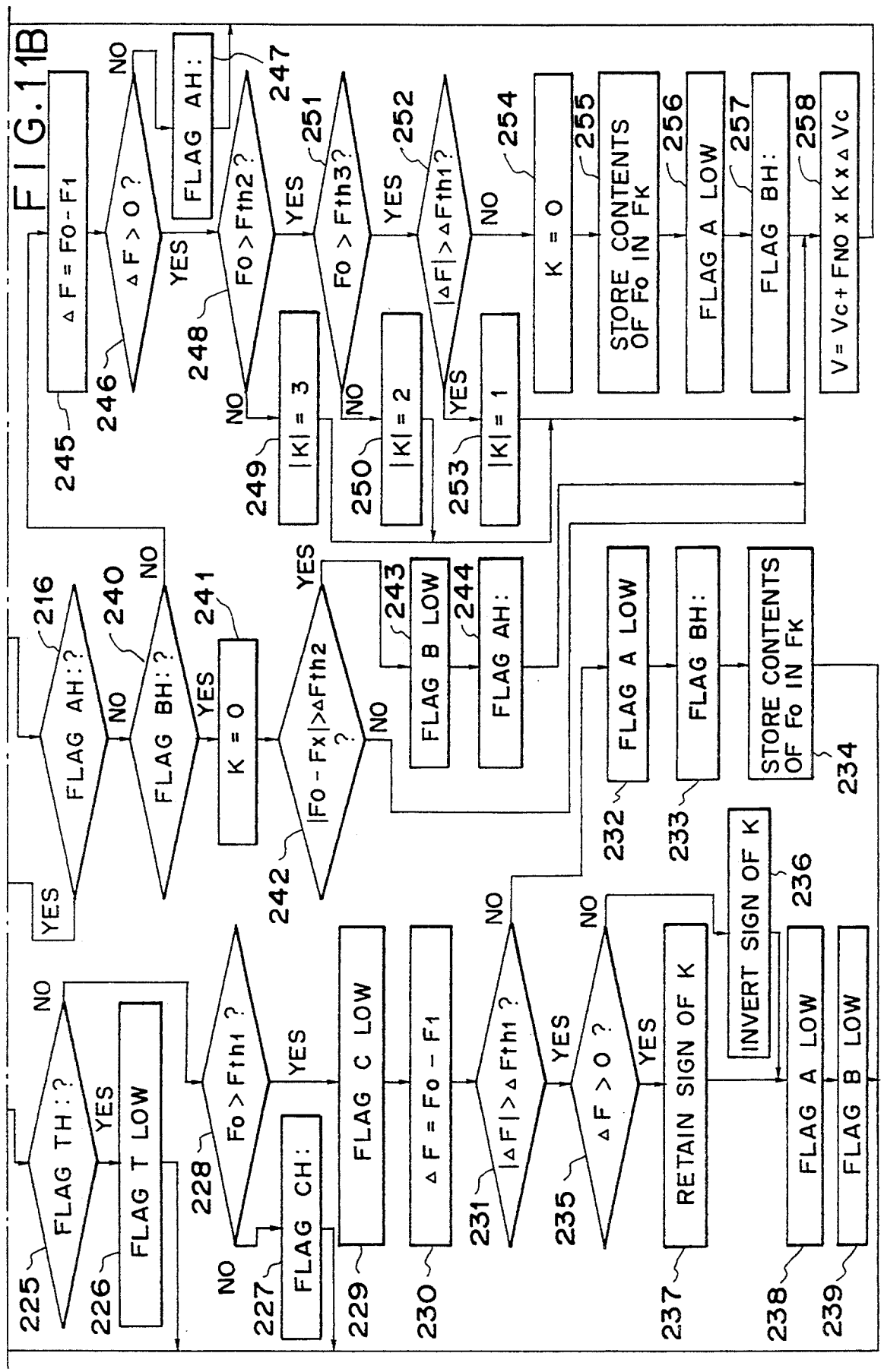

FIG.13

Es IS LARGE AND dEs IS SMALL ⟶ K IS 0

K IS POSITIVE (NEGATIVE) AND Es IS
LARGE AND dEs IS POSITIVE AND
LARGE (NEGATIVE AND LARGE)
⟶ K IS POSITIVE AND SMALL
(NEGATIVE AND SMALL)

K IS POSITIVE (NEGATIVE) AND FV
IS LARGE AND dFV IS POSITIVE
AND LARGE, AND dEs IS NOT
POSITIVE AND LARGE
⟶ K IS POSITIVE AND MEDIUM
(NEGATIVE AND MEDIUM)

K IS POSITIVE (NEGATIVE) AND FV
IS MEDIUM AND dFV IS POSITIVE
AND SMALL, AND dEs IS NOT
POSITIVE AND LARGE
⟶ K IS POSITIVE AND LARGE
(NEGATIVE AND LARGE)

F I G. 15
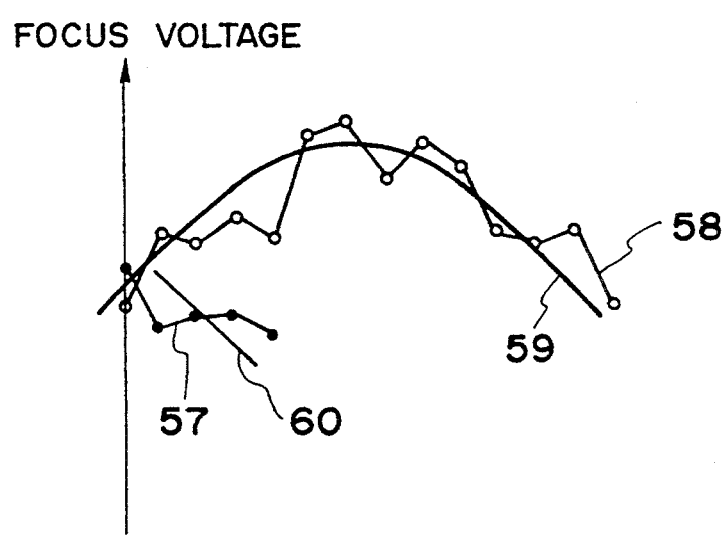

LENS CONTROL DEVICE

This is a continuation application under 37 CFR 1.62 of prior application Ser. No. 08/164,617, filed Dec. 9, 1993 (now abandoned), which is a continuation of Ser. No. 08/082,260 filed Jun. 24, 1993 (now abandoned); which is a continuation of Ser. No. 07/917,166, filed Jul. 20, 1992 (now abandoned).

BACKGROUND OF THE INVENTION

1. Field of the Invention

The present invention relates to a lens moving speed control device for focusing in a zoom lens for use with an image pickup device such as a video camera.

2. Related Background Art

Conventionally, a variety of lens types have been provided for a zoom lens for use with a video camera. FIG. 1 shows the configuration of a conventionally typical zoom lens. 1 is a front lens group for making the focus adjustment by moving in an optical axis direction, 2 is a variator lens group for the magnification changing, 3 is a compensator lens group for retaining the imaging plane fixed in the magnification changing, in which the variator lens group 2 and the compensator lens group 3 are moved in the magnification changing while retaining a predetermined relation.

4 is a lens group for the image formation, and 5 is an imaging plane on which an image pickup element such as a CCD is arranged. It is the common practice to have a fixed interlock relation between the variator lens and the compensator lens, a so-called front focus lens which makes the focusing with the front lens group as shown in FIG. 1 is mechanically interlocked therewith using a mechanical cam ring.

On the other hand, there is known a lens of the type generally referred to as an inner focus or rear focus which makes the focusing with a lens group behind the variator lens, unlike the front focus lens.

FIG. 2 shows an example of rear focus zoom lens of this type, in which the front lens group is fixed therein, and the variator lens group 2 and the compensator lens group 3 are interlocked using a mechanical cam ring in a certain relation, like the front focus lens group as shown in FIG. 1. 4 (or a part of 4) is a lens group for the focusing. When the focus lens group is disposed behind a magnification changing lens in this manner, it is necessary to move the lens group 4 during the zooming even if the object distance is constant, and the position occupied by the lens group 4 in accordance with the focal length will change depending on the object distance.

FIG. 3 shows the focusing positions of the lens group 4 of FIG. 2 dependent upon the focal length as represented for several object distances. In the same figure, the abscissas axis indicates the focal length, in which "W" is a wide edge of the zoom lens, and "T" is a tele edge thereof. Note that the zoom lens as denoted hereinafter indicates a variator lens. The ordinates axis indicates the position of the lens group 4, in which each curve (or straight line) as indicated by 6 to 10 represents the focusing position depending on the focal length for a certain fixed object distance. For example, 6, 7, 8, 9 and 10 show focusing loci with object distances of 50 cm, 1 m, 2 m, 10 m and ∞, respectively.

When the lens group 4 is greatly fed out (or moved to the object side) in wide as a position indicated by 11, the focusing is possible at a distance immediately before the lens.

Another inner focus lens configuration example is shown in the figure. In this case, a lens group 1, a variator lens 2, and an iris 12 are moved in a direction of the arrow in changing the magnification from wide to tele, in which 4A is a fixed lens group and 4B is a focus lens group.

In this case, since there is no compensation lens group (corresponding to the lens group 3 in FIG. 2) interlocked in a predetermined relation behind the variator lens 2, the graph as shown in FIG. 3 is represented as in FIG. 5. For example, 13, 14, 15, 16 and 17 show the focusing loci at the object distances of 50 cm, 1 m, 2 m, 10 m and ∞, respectively.

The lens system having the characteristics as shown in FIG. 5 may be, in addition to an optical system of FIG. 4, such that the lens group 1 and the iris 12 are fixed and the lens group 2 only is moved in zooming in the same figure.

In this way, the lens referred to as an inner focus or rear focus has the advantage that it allows for the focusing in a shorter range than with the front focus lens, and contributes to the realization of a smaller lens depending on the lens type, but conversely, the position of focal plane may shift even with no change of the object distance in zooming, whereby it is necessary to correctly retain the relation as shown in FIGS. 3 and 5 in accordance with the distance not to cause out of focus during the zoom operation.

The method of preventing such out of focus from occurring with the zoom operation will be discussed in the following.

First, a combination with an automatic focus adjusting device of the TTL method will be described. For example, in an automatic focus adjusting device for a video camera, a method is generally known in which the peak of high frequency component of an image pickup signal from CCD or the like is used as a focusing position.

FIG. 6 shows the principle thereof. Taking the position of lens group for the focus adjustment in the abscissas axis and the high frequency component (focus voltage) of image pickup signal in the ordinates axis, a peak is reached at a position as indicated by the arrow in the figure, this position A being a focusing lens position.

FIGS. 7A and 7B show an example of how to obtain the focus voltage F as shown in FIG. 6.

FIG. 7A shows an actual field of view for the image pickup, in which 20 is an angle of view, 18 is a range (distance measuring frame) for picking up a video signal for the automatic focus adjustment, and 19 is an object.

In FIG. 7B, (a) shows an object within the distance measuring frame. (b) is a video signal (Y signal) of the object as shown in (a). Differentiating this signal, it has a wave form as shown in (c), and further taking the absolute value thereof, it has a wave form as shown in (d). A signal (e) is obtained through the sample-and-hold of the signal (d), and the level F thereof is a focus voltage.

FIG. 8 shows a block configuration diagram of a camera having a combination of such an automatic focus adjusting device and an inner focus lens. An image pickup element such as a CCD is disposed at an imaging position 5. Then a luminance signal Y is produced by a camera circuit not shown, and the information within the distance measuring frame is input to a focus detection (AF) circuit 21. In the AF circuit, the focus voltage is obtained with the aforementioned method, whereby based on this focus voltage and the direction of driving the focusing lens 4B or the sign of change in the focus voltage value caused by the driving, the focusing is judged, and if unfocused, the kind of out of focus is determined to be front focus or rear focus, and based on this determination result, a focus lens driving motor 22 is driven in a predetermined direction.

However, it is quite difficult to make an accurate positional control of the lens group 4B during the zooming and remove the out of focus, based only on such a distance measurement result of the automatic focus adjusting device using an image pickup signal.

That is, in the near-tele, far distance as shown in FIG. 5, there is a great movement of the focus lens group (i.e., upward inclination of the curve) for minute variation in the abscissas axis (minute positional variation of the variator). This shows that the out of focus state will easily result unless the distance measuring operation of the automatic focus adjusting device is performed rapidly and correctly.

Generally in the automatic focus adjusting device using an image pickup signal, the interval at which the distance measuring result is obtained is about 1/60 second at minimum as it is restricted by the field period.

Accordingly, there is a limit of the "rapidness", and all the distance measuring results are not obtained correctly for every 1/60 second in practice, and further, it is difficult to optimize the selectable moving speed of the focus lens at a time.

From the above considerations, it will be found that with a configuration as shown in the block diagram of FIG. 8, it is impossible to remove the out of focus in zooming unless there is provided means for reducing the zoom speed to an extremely low value particularly at the tele end.

Thus, a second means for removing the out of focus in zooming is contemplated in which the data of focusing locus as shown in FIGS. 3 and 5 is stored within a CPU in the form of expression, positional data or focus lens moving speed relative to the zooming speed, and the driving contents of both actuators for a zoom motor for the driving of variator lens and a focus motor for the driving of focus lens are determined from the memory contents as well as the information as to the focal length in zooming and the position of focus lens.

For example, when a map indicated with the focal length in the abscissas axis and the focus lens position in the ordinates axis as shown in FIGS. 3 and 5 is subdivided into small regions I, II, III, IV, . . . . . as shown in FIG. 9, and the moving speed of the variator lens in the abscissas axis is assumed to be $V_V$, a method for storing the moving speed $V_F$ of the focus lens for each region has been disclosed in Japanese Laid-Open Patent Application No. 1-280709. In this case, the speed $V_F$ is obtained by differentiating the focusing locus passing through a central point of a small region. When the zooming is performed using $V_V$ and $V_F$, the focusing can be maintained under the condition where the object distance is not changed during the zooming in a tele to wide direction, while the focusing is difficult to maintain totally in zooming in a wide to tele direction.

This is because the interval between each curve corresponding to a respective object distance which is dispersed over a wide position range at the tele end, e.g., each locus representing the focusing point from ∞ to 1 m, converges into a narrow range on the wide side owing to the relation of depth of field (i.e., the positional difference of focusing point decreases), as can be clearly seen from FIGS. 3 and 5. On the other hand, if the width of depth is obtained on such a map, based on a permissible circle of confusion with a certain iris value, it is in most cases substantially constant irrespective of the focal length in the inner focus lens. Accordingly, in the focusing state on the wide side, the focusing point (which lies within a depth but is unknown precisely) is not necessarily located on a true focusing locus, whereby even if the focus lens position at that time is known, it does not necessarily trace a correct curve due to the divergence of the curve on the tele side, so that the focusing point on the tele side can not be determined accurately.

As above described, it is difficult to prevent out of focus from occurring during the zooming even if the object distance is not changed with the inner focus lens, whereby in general, the out of focus is removed with a zooming algorithm consisting of the aforementioned two methods, i.e., the automatic focus adjusting device of the TTL type using the image pickup signal and the memorized focusing locus of the map.

For example, Japanese Laid-Open Patent Application No. 3-41878 discloses a method in which the direction of out of focus is determined to be front focus or rear focus, based on a phase of the variation of focus voltage when the CCD is displaced minutely in an optical axis direction by a piezoactuator, and based on this determination result, the speed content for correcting for the front focus or the rear focus as well as the aforementioned speed for each small region are memorized to thereby select an optimal speed among them.

In this case, it is possible to remove entirely the out of focus in zooming in a wide to tele direction, but there are some problems with the cost, the size and the consumption power due to the use of a piezoactuator.

In order to detect the out of focus direction when unfocused, in addition to a method for detecting the front focus or rear focus with the so-called modulation method in which an optical member is displaced minutely in an optical axis direction by a piezoactuator, there is known a so-called trial method in which the focus lens is moved temporarily in either one direction, and further moved depending on whether the change of focus voltage is increasing or decreasing at that time.

Generally, the trial method for the detection of front focus or rear focus will take a longer time for the determination, and is more difficult to make a rapid determination, than the modulation method.

As will be clearly seen from the above discussion, in order to remove the out of focus arising in a lens of the inner focus type by using the trial method for determining the direction of front focus or rear focus, it is requisite to resolve the following problems:

① As the focusing lens needs to change continuously the position in accordance with the focal length and the object distance, it is necessary to make a considerably minute setting or switching of the focus motor speed to perform the operation of "moving the focus lens to the front focus or rear focus side temporarily".

② In order to obtain adequately the variation of focus voltage, the setting of the focus motor speed in consideration of the change in the depth of focus in F number is necessary. Therefore, the method of remembering the service speed for each small region as previously described was insufficient.

SUMMARY OF THE INVENTION

The present invention was achieved to resolve the above-mentioned problems, and the first object thereof resides in providing a lens control device capable of performing the zooming without out of focus in any situation.

The second object of the present invention is to provide a lens control device in which the out of focus in zooming especially in a wide to tele direction is greatly improved.

The third object of the present invention is to provide a lens control device in a smaller size, with reduced consumption power and a lower cost.

To accomplish these objects, according to a preferred embodiment of the present invention, there is disclosed a lens control device comprising a zoom lens, a focus lens for correcting the focus position along with the movement of the zoom lens, and control means for driving the focus lens, based on a speed in which a reference speed determined by the positions of zoom lens and focus lens which is corrected in accordance with the depth of field and the focus state, while the zoom lens is being driven.

Also, according to a preferred embodiment of the present invention, there is disclosed a lens control device comprising a zoom lens, a focus lens for correcting the focus position along with the movement of the zoom lens, and control means for driving the focus lens, based on a speed which is equal to zero if the zoom lens is not moved or equal to a reference speed determined by the positions of zoom lens and focus lens which is corrected in accordance with the depth of field and the focus state while the zoom lens is being driven.

Also, according to a preferred embodiment of the present invention, there is disclosed a lens control device having the control means configured such that the moving speed V of the focus lens is operated by an expression $V = V_C + F_{NO} \times K \times \Delta V_C$, where $F_{NO}$ is the information as to the depth of field, K is a coefficient concerning the focus state, $V_C$ is a reference speed determined by the positions of zoom lens and focus lens, and $\Delta V_C$ is a variation of the reference speed $V_C$.

The fourth object of the present invention is to provide a video camera in which the driving of focus lens can be achieved at an optimal speed corrected for various conditions of focusing such as the depth of field, the position of zoom lens, front focus, rear focus, and the degree of focusing, and the minuter speed change suitable for the trial method is allowed in setting the focus lens moving speed during the zooming of inner focus lens, whereby the out of focus can be greatly improved during the zooming of inner focus lens in a wide to tele direction without regard to photographying conditions, such video camera being realized in a smaller size, with reduced consumption power and a lower cost.

The fifth object of the present invention is to provide a lens control device with which the zoom operation of inner focus lens can be performed without out of focus, with an improved precision of detecting the direction of out of focus at the start of the zoom operation, in which the focus lens is allowed to accurately trace a focusing locus along with the focus lens following the zoom lens in the focusing state.

The sixth object of the present invention is to provide an automatic focus system which is highly accurate and rapid, with an improved precision of detecting the direction.

To accomplish these objects, according to a preferred embodiment of the present invention, there is disclosed a lens control device comprising a first lens group to be driven in the magnification changing operation, a second lens group for correcting the focus position which varies with the movement of the first lens group or the change in the object distance, focus detecting means for detecting the focal state, and control means for controlling the driving of the first lens group in such a manner that if the focal state detected by the focus detecting means is not placed in a predetermined state at the start of driving the first lens group, the second lens group is driven to take the predetermined focal state, ahead of driving the first lens group.

Also, according to a preferred embodiment of the present invention, there is disclosed a lens control device comprising a zoom lens for a magnification changing operation, a focus lens for correcting the focus position which varies with the movement of the zoom lens or the change in the object distance, focus detecting means for detecting the focal state, and control means for controlling the start of driving the zoom lens in such a manner as to drive only the focus lens ahead of the zoom lens, at the start of driving the zoom lens, so as to transfer from the focusing state to a predetermined unfocused state based on an output of the focus detecting means, thereby determining the front focus or rear focus, and then to drive the zoom lens.

Thus, at the zooming operation, it is possible to prevent the out of focus from occurring immediately after the start of zooming, if the driving of the zoom lens is started in such a manner as to first drive the focus lens alone before driving the zoom lens to transfer from the focusing state to a predetermined unfocused state, thereby determining whether its state is front focus or rear focus, and the precision of detecting the direction can be improved because of the ability of acquiring a great number of previous focus voltage values usable for the determination of focusing or unfocusing during the zoom operation.

Other objects and features of the present invention will be apparent from the following description and drawings.

BRIEF DESCRIPTION OF THE DRAWINGS

FIG. 11a and 11b show is a flowchart showing a control algorithm for the focus lens speed in this embodiment.

FIG. 13 is a view for explaining the rule of applying the fuzzy logic reasoning in the second embodiment of the present invention.

FIG. 15 is a view for explaining the follow-up operation of the focus lens to the focusing locus.

DETAILED DESCRIPTION OF THE PREFERRED EMBODIMENTS

Figure 4:
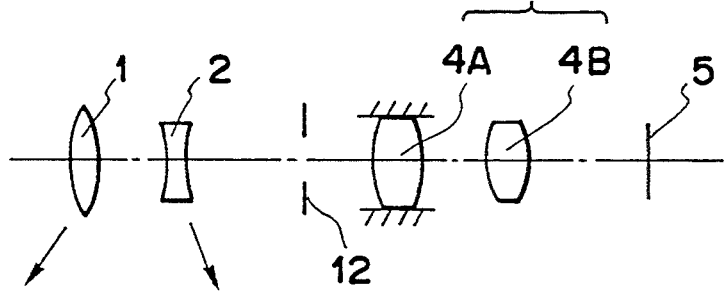
FIG. 4 is a view showing another example of a zoom lens of the rear focus (inner focus) type.
Figure 10:
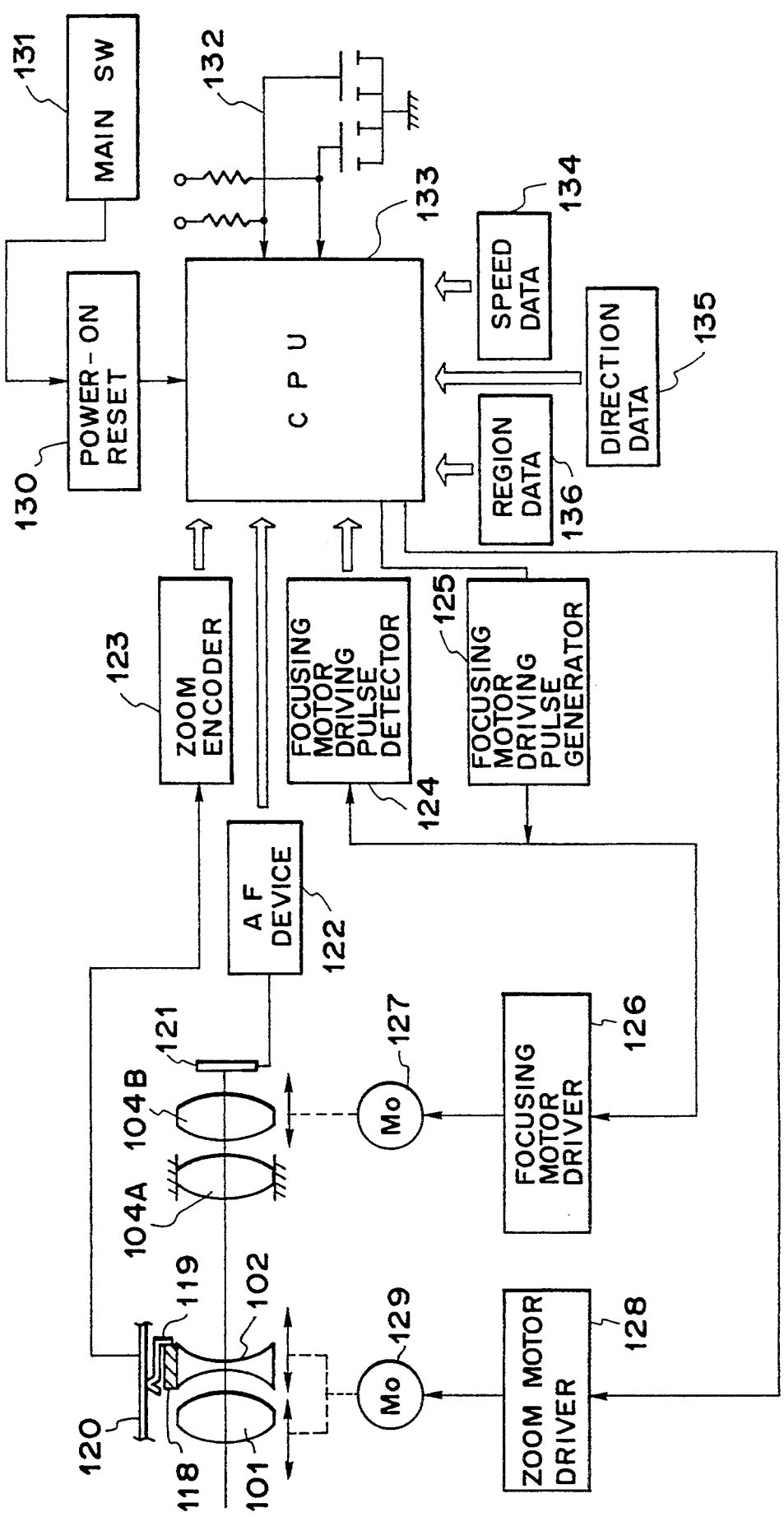
FIG. 10 is a block diagram showing the positional configuration in a first embodiment in which a lens control device of the present invention is applied to a video camera.

FIG. 10 is a block configuration diagram of an AF system for the inner focus lens type in a form suitable for carrying out the present invention. In the same figure, each lens group 101, 102, 104A and 104B is the same as each lens group 1, 2, 4A and 4B in FIG. 4.

A mirror frame 118 of a variator lens group 102 (a zoom lens as denoted in the following description signifies a variator lens) is integrally provided with a brush portion 119 for the detection of position, which is rubbingly moved on a substrate 120 on which variable resistors and Gray code patterns are printed when a variator moves. The focal length can be detected by picking up this output with a zoom encode circuit 123 and the information obtained is input to a system control CPU 133.

For detecting the position of the focus lens 104B, using a stepping motor for example as a focus motor 127, the number of driving pulses given to this stepping motor is entered by a focus motor driving pulse detector 124 to the CPU 133.

Figure 9:
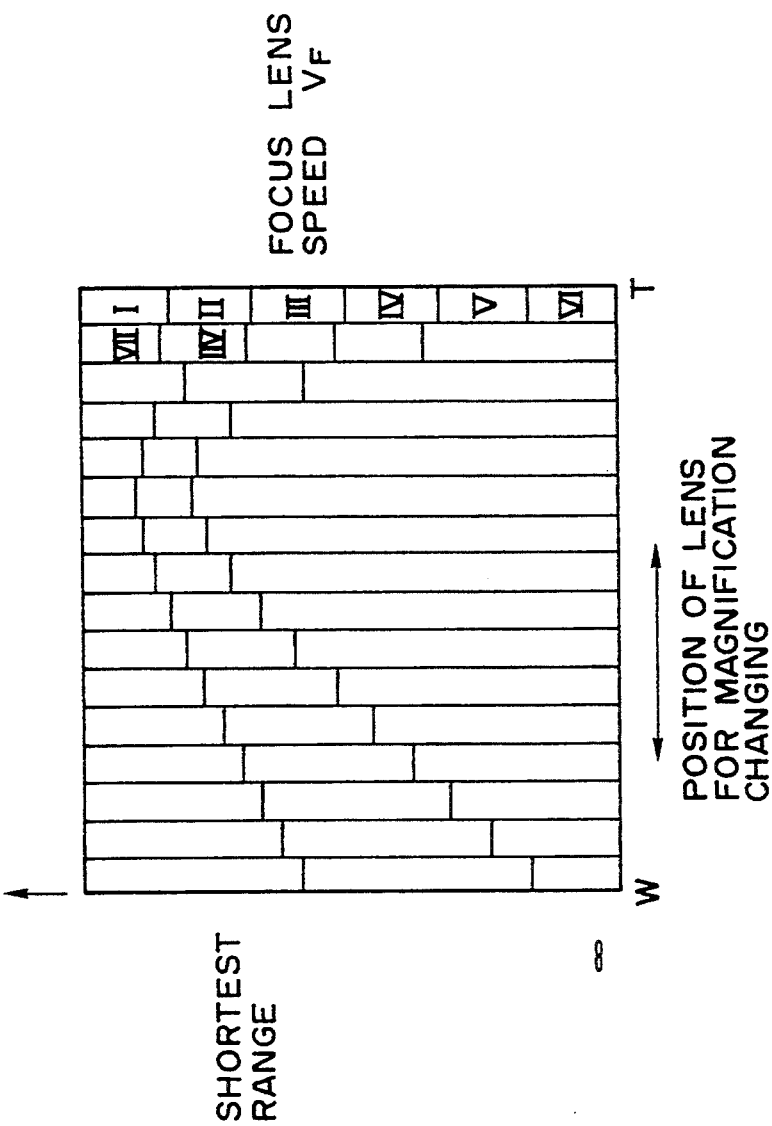
FIG. 9 is a view showing a map divided into a plurality of small regions for each of which the focus lens drive speed in accordance with the focal length is stored, with the zoom lens position (focal length) in the abscissas axis and the focus lens position (object distance) in the ordinates axis.

An object image formed on an image pickup plane 121 of image pickup element is converted from optical to electrical form to be output as a video signal, which is supplied to a camera process circuit not shown, as well as the AF device 122, where that signal is detected as a focus voltage in accordance with the focusing state based on the signal component such as a level of high frequency component of the video signal or the sharpness of image edge which may be varied depending on the focusing state, and then entered into the CPU 133. The CPU 133 makes a determination of focusing or unfocusing and a determination of front focus or rear focus from the information of the focus voltage supplied from the AF device 122. Further the CPU 133 determines the total drive contents for a zoom motor 129 and a focus motor 127 by referring to the focus lens position information, the zoom lens position information, which are detected by each encoder, the information as to the operation state of a zoom switch 132, and the speed, the direction and the area data from memories 134 to 136 which store the speed data, the direction data and the area data respectively representing the focusing locus, in a map drawing the focusing locus indicating the focus lens position focusable relative to the zoom lens position as shown in FIG. 9, and controls respective motor drivers 128, 126 so that the focus lens 104B can trace on the focusing locus which is determined by the zoom lens position and the focus lens position as shown in FIG. 9.

It should be noted that the zoom motor 129 may be driven at a fixed speed with a predetermined voltage.

In the configuration of the present invention in which the focus lens position information is read by the number of steps for the stepping motor, the position information will be extinguished when the power is turned off, so that when the power is turned on at the next time, a correct position count is not restored. Accordingly, when a main switch SW 131 is turned on, a power-on reset 130 is caused to control another switch not shown to return the focus lens group 104B to an initial position, and restart the count.

The setting of the focus lens driving speed in this invention will be described below.

The present invention is the same as a prior application by the present applicant as previously mentioned, in that the movement area of zoom lens and focus lens is subdivided into a plurality of small regions, as shown in FIG. 9, and for each region, the speed $V_C$ which is differentiated at a central point thereof and can correctly trace the locus is only stored, but the present invention has a feature that the optimal focus lens drive speed is operated by correcting the stored trace speed in accordance with various conditions.

In the present invention, the final focus lens drive speed $V_F$ is calculated by the following expression.

$$V_F = X \times (V_C + K \times F_{NO} \Delta V_C)$$

For the zoom lens moving speed, a speed presumed in obtaining the speed $V_C$ determined on design is set on the design (voltage setting). However, the zoom lens moving speed may have an error.

In this expression, X is a coefficient for correcting for a deviation from a design value of the variator lens moving speed, and $F_{NO}$ is a correction coefficient of iris value $F_{NO}$ to correct for the focus detection sensitivity based on the depth of field. K is a coefficient determined from a plurality of signals including a focus voltage by the CPU 133, which has a sign (+) in driving the focus lens in a direction of front focus from the state of tracing the focusing locus during the zooming operation, and a sign (−) in driving the focus lens in a direction of rear focus, with its absolute value determining a speed difference from the trace speed. $\Delta V_C$ is a minimum variation of the difference between trace speed and used speed.

The present invention allows for the driving of a focus lens at an optimal speed corrected for various conditions of focusing state such as dispersion in the speed of zoom lens, depth of field, zoom lens position, front focus, rear focus, and degree of focusing by driving the focus lens on the basis of this expression, and in setting the focus lens moving speed during the zooming operation of inner focus lens, allows for the more minute speed variation suitable for the trial method, whereby it is possible to improve greatly the out of focus during the zooming operation of inner focus lens in a wide to tele direction, irrespective of the photographing conditions, and realize the compactization, a reduced consumption power and a lower cost.

In the following, actually based on the above expression, an algorithm for determining the focus lens driving speed will be described.

In the present invention, the lens control is performed by a control program stored in the CPU 133, based on the above-described principle, and specifically, the driving speed of the focus lens is determined in accordance with a flowchart as shown in FIG. 11.

The flowchart of FIG. 11 will be described below.

At step 201, an automatic focus adjustment routine within the CPU 133 is started. The steps 202 to 203 are for the initial reset which is performed once initially after the start of control, in which at step 202, flag A and flag T are set high. At step 203, the focus voltage value F at that time is stored in memory as $F_O$.

Steps 204 to 215 are processes for the reading of an iris value $F_{NO}$, the determination of a reference follow-up speed $V_C$ of focus lens corresponding to the positions of zoom lens and focus lens which are stored in each region as shown in FIG. 9, and the pick up of a focus voltage value F for each V, which are used in calculating the expression $V = V_C + F_{NO} \times K \times \Delta V_C$ which is a feature of the present invention. Note that the term of X in the previous expression $V = X \times (V_C + F_{NO} \times K \times \Delta V_C)$ has been excluded from this flow for the convenience of explanation.

At step 204, whether the photographer has designated the operation of a zoom switch 131 is determined. If the zoom switch 131 is depressed, flag Z is set high at step 205, and the position of 2 group zoom lens 102 is detected at step 206. Then at step 207, the absolute position of the focus lens 104B is detected, in an example of FIG. 10, by counting the number of steps for the stepping motor. The small regions as indicated by I, II, . . . . in FIG. 9 are determined at step 208 from the positions of variator lens group and focus lens group obtained at steps 206 and 207, and at step 209, the stored values of the speeds $V_C$ for the small regions determined are read from the memory.

On the other hand, if the zoom operation has not been performed at step 204, flag Z is set low at step 210, and the zoom motor is stopped (if it is in drive).

At step 211, the focus motor driving speed $V_C$ is rendered zero. That is, in the present invention, the service speed of the focus motor is basically calculated with an expression $V = V_C + F_{NO} \times K \times \Delta V_C$, whether the zooming is performed or not, and $V_C$ is set zero if the zooming is not performed. This is due to the fact that when the zoom operation is not performed, there is no positional deviation of the focal plane caused by the zoom operation, so that it is unnecessary to correct the focus lens which is retained in the focusing state.

At steps 212 and 213, the content of newest focus voltage $F_O$ is sent to $F_1$, and the content of newest F is stored in $F_O$, whereby $F_O$ is updated. That is, $F_O$ is a current focus voltage, and $F_1$ is a focus voltage value one step before. At step 214, the iris value $F_{NO}$ is read, and at step 215, its value is converted into a value to be used in the previous expression.

Various methods for detecting the iris value have been known. For example, a method of disposing a Hall element in an iris meter is known, in which the output of the Hall element is A/D converted to obtain the iris value from a conversion expression or conversion table prestored in the CPU. Also, in the expression for obtaining V, $F_{NO}$ is different in the actual calculation, depending on an iris value with reference to which $\Delta V_C$ is set. For example, when an iris value F=1.0 is referenced, the actual iris value can be directly used. Theoretically, in order to retain constant the changing speed of the circle of confusion, the coefficient $F_{NO}$ must be changed in proportion to the iris value, but if there is any inconvenience in the actual operation, such a conversion may be performed within the CPU 133. For example, there are some cases in which the coefficient $F_{NO}$ may not be determined with a simple ratio of iris value, depending on the extent that the data used in calculating K pertains to the old data.

At step 216, the determination of flag A is made. At step 202, flag A is set high, which means that when the direction (rear focus, front focus) is unknown, as occurs when the focusing or unfocusing is not determined, or when the focusing state is changed to the unfocusing state, the operation is bypassed to a routine from step 217 to step 239.

As this embodiment is involved in the automatic focus adjusting device with the trial method, the driving direction for "temporarily moving the focus lens 104B in either direction" is first determined at 217. In the arithmetic expression, determining the sign of K corresponds to this operation. In this embodiment, a table of random numbers is used for its determination. Then at step 218, the state of flag C is judged. The flag C serves to increase the speed of "temporal movement" whereby the focus lens is fed at a higher speed by making the judgment of an extremely unfocused state when a sufficient amount of signal change to determine the direction can not be obtained. At the first cycling, flag C is low, and for the initial set speed of "temporal movement", $|K|$ is set to 1 in this example, at step 220. This value may vary depending on the setting of $\Delta V_C$, but for example, in a case where the distance measurement of a video camera of NTSC type is made for every three fields with one field for 1/60 sec (1/20 sec), or the ability of the focus adjusting device to determine the out of focus is on the order of about one pulse for the stepping motor when the iris value is 1.0, or the permissible circle of confusion (circle of confusion beyond which out of focus is recognizable) is about three pulses away from a true focusing point, with the coefficient $F_{NO}$ being directly an actual iris value, a variation of 1 to 2 pulses in 1/20 sec. is desirable. That is, 20 to 40 pps is sufficient for the calculation of $K \times \Delta V_C$ in the correction term. For example, $\Delta V_C$ is set to 30.

In practice, the focusing lens driving speed V at F2.0, K=1, $V_C$=200 pps during the zooming is calculated to be V=200+2.0×1×30=260 pps as the service speed.

At step 221, such a calculation is performed. At step 222, the presence of absence of zoom operation is judged, whereby at the zoom operation, both the zoom motor and the focus motor are started simultaneously at step 223. Step 224 is carried out other than at the zoom operation, in which the focus motor only is driven.

At step 225, flag T is judged. The flag T, which is high only immediately after the power is turned on, is set low in this case, and the operation returns to step 204. That is, since the contents of focus voltage $F_O$ and $F_1$ are not those detected at different lens positions immediately after the power is turned on, the conditions for the correct direction determination are not prepared, and the determination process for the focus state is skipped once.

At the second and subsequent cycles, the operation proceeds to step 228 as a result of the determination at step 225, because the flag T is set low at step 226 of the first cycle. First, $F_O$ and a predetermined threshold $F_{th1}$ are compared, in which if $F_O$ is smaller, the flag C is set high, and at step 219, $|K|$ value is incremented to raise the speed. The smaller $F_O$ value means that the focus voltage is extremely low in an extremely unfocused state, whereby the acceleration is made to obtain a sufficient difference between $F_O$ and $F_1$. However, if the direction is wrong in making the acceleration, the focus voltage does not necessarily exceed $F_{th1}$. Accordingly, it is desirable to make this portion have a smoother movement by the addition of some other decision terms, which is however no essence of the present invention, the description thereof being omitted here.

At step 229, flag C is set low. At step 230, the calculation $\Delta F = F_O - F_1$ is performed to detect the direction (rear focus or front focus) with the trial method. At step 231, a comparison between $|\Delta F|$ and $\Delta F_{th1}$ is made. $\Delta F_{th1}$ is a threshold for the determination of focusing or unfocusing, in which if $|\Delta F|$ is lower than this threshold, the focusing is determined. For the focusing, at steps 232, 233, flag A is set low and flag B is set high, and at step 234, $F_O$ is stored in $F_K$ which is a reference for the determination of focusing or unfocusing. Since the flag A is low and the flag B is high, the subsequent operation will proceed in accordance with the flow of steps 241 to 244 through the determination of steps 216 and 240. If $|\Delta F| > \Delta F_{th1}$ is determined at step 231, the sign of $\Delta F$ is ascertained at step 235 because of the possibility of the direction determination, in which the sign of K is retained (step 237) if $\Delta F$ is positive, or is inversed if negative (step 236). Thereby, the direction of the corrected speed for the focus lens relative to the reference speed $V_C$ is determined.

After the decision of the direction, flags A and B are set low at steps 238, 239. Thereupon, a routine for unfocusing to focusing which follows the step 245 is entered from the next cycle, after the execution of steps 216 and 240.

If the judgment at step 231 is no and the focusing is supposed, the operation which follows will pass through the steps 204 to 215 as in the previous cycle to lead to the step 241. Because of the focusing, K is equal to zero. That is, at the zooming, V is equal to $V_C$, and the focus lens is driven only to correct for a deviation of the focal plane caused by the zooming. If the zooming is not performed, the focus motor is stopped.

At step 242, a comparison is made between an absolute value of a current focus voltage minus a focus voltage $F_K$ used in the focusing determination and $\Delta F_{th2}$. $\Delta F_{th2}$ is a threshold for the determination of focusing to unfocusing (or signal change), meaning the restart after focusing. If the judgment at step 242 is no, the operation proceeds directly to step 258, while if it is yes, the flag B is set low and the flag A is set high (steps 243, 244) because of the possibility of unfocusing, whereby the operation which follows will lead to the step 217 through the determination at step 216.

If the judgment at step 231 is yes, and thus the unfocusing and the direction of front focus or rear focus are determined, at the next cycle, the judgment at step 240 will be no, and the operation proceeds to step 245. At step 245, $\Delta F = F_O - F_1$ is calculated, and at step 246, the sign is checked, in which if it is negative, the flag A is set high at step 247, whereby the step 217 is entered from the next cycle. For this judgment, an algorithm can be contemplated in which the judgment is made true only if the change of sign is recognized more than a preset frequency or a preset number in a predetermined total trial number, rather than immediately deciding with one negative occurrence, while taking into consideration that $\Delta F$ does not necessarily continue to be positive (even with the correct rotational direction of motor) due to noises produced in practice. Herein the algorithm is shown in the simplest form because it is not an essence of the present invention.

The steps 248, 251, 252 are processes to determine the extent of out of focus and change the speed content. $F_{th2}$ is a greater threshold than $F_{th1}$ at the focus voltage, and if $F_O$ exists between $F_{th1}$ and $F_{th2}$, the determination at step 248 is no, and at step 249, the absolute value of K is set to 3. That is, this is an unfocused case, with a known direction of out of focus, and a significantly greater degree of out of focus. Since if $F_{th3}$ is greater than $F_{th2}$, the out of focus is considered to be substantially medium, $|K|=2$ is set at step 250 when $F_O$ lies between $F_{th3}$ and $F_{th2}$. When $F_O$ is greater than $F_{th2}$, and $\Delta F$ is greater than $\Delta F_{th1}$ as previously described which is a threshold for the focusing determination, $|K|=1$ is set at step 253 as the extent of out of focus is small. If the focusing is determined at step 252, the transfer from unfocusing to focusing is supposed, whereby K=0 is set at step 254, and the same operation as steps 232 to 234 is performed at steps 255 to 257.

At step 258, the actual speed V of focus lens is calculated on the basis of the value of K determined in the above processing, and in accordance with the expression (1). Note that the speed of focus motor is set for example at step 221 or 258 in processing, and is replaced with the newest V calculated in entering the step 204.

As above described, in the present invention, calculating the speed of focus motor with the previously-mentioned expression $V = V_C + F_{NO} \cdot K \cdot \Delta V_C$ can occur "regardless of whether the zooming is performed or not.

(a) V can be set by using fundamentally the same routine with the trial method during the zooming and at other times ($V_C = 0$ if not zooming).

(b) If $\Delta V_C$ is appropriately set, the setting of V can be made easily thereafter in which the circle of confusion is changed on the same condition not dependent on $F_{NO}$ (with $F_{NO}$ as a coefficient) and in accordance with the state of out of focus.

(c) If K is changed, there is a merit that a more minute speed change is allowed, so that the out of focus can be suppressed to the extent as least as possible at the zooming in a wide to tele direction when the inner focus lens is used.

In the first embodiment of the present invention, as above described, the speed is determined using $|K|=0$ to $|K|=3$, but it will be appreciated that in order to make a more minute speed control more smoothly, which is a feature of the present invention, $\Delta V_C$ is set to a small value of $\Delta V_C = 5$, rather than $\Delta V_C = 30$ as shown in the description of the first embodiment, and $|K|$ is appropriately used in a wider range (e.g., $|K|=0$ to 100).

In such a minute determination of K, the fuzzy reasoning which has been increasingly applied to recent control systems is suitable, rather than a flowchart with the IF statement as shown in FIG. 11.

Figure 12:
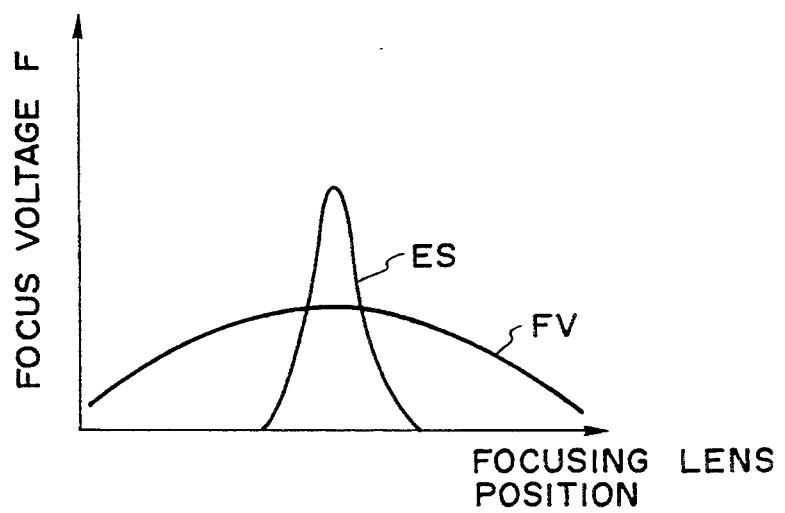
FIG. 12 is a characteristic diagram showing the relation between focus lens position and focus voltage in a second embodiment of the present invention.

In the first embodiment, the signal for obtaining the focus voltage consists of one kind, while in the second embodiment, it is assumed that two signals of a signal ES corresponding to the width of edge portion of an object image and a high frequency component signal FV, as shown in FIG. 12 can be utilized. The edge width signal ES is to detect the focusing using a property that the edge width is narrower in approaching to a focusing point, in which supposing $ES = 1/\Delta x$ where $\Delta x$ is an edge width, a peak occurs at the focusing point.

As shown in the figure, ES has a property of having a steep characteristic near the focusing point, but a gentler characteristic than FV. Note that the method of detecting these signals is known in for example Japanese Laid-Open Patent Application No. 62-103616, the description thereof being omitted. In this case, the rules for determining the K value with the fuzzy reasoning are shown in FIG. 13, as an example.

For example, the content of a rule marked with a symbol ○ is such that when the sign of current K is positive, ES indicates a great value, and dES (a variation for ES relative to ΔF) is positive, while the absolute value thereof is small, ES is believed to be located at the great value quite possibly and near the focusing, whereby the sign of K remains unchanged and the speed content is rendered smaller.

In practice, input membership functions are respectively given to Es, dES, FV, dFV (variation of FV) and K using the rule 6, and an output membership function is given to K being finally output.

As in this example, by introducing the fuzzy reasoning for the determination of K, the more minute speed control is allowed using an arithmetic expression $V = V_C + F_{NO} \cdot K \cdot \Delta V_C$, which is a feature of the present invention.

That is, the value of K is not simply determined by the threshold, but determined by including vague factors for the value of K, as well as K=0, whereby the more natural control is allowed.

While in the first and second embodiments the way of determining the coefficients for the expression $V = V_C + F_{NO} \cdot K \cdot \Delta V_C$ which is an expression of determining the focus lens speed has been described, in the third embodiment as herein described, the speed operation method using an expression $V = X \times (V_C + F_{NO} \cdot K \cdot \Delta V_C)$ where a correction term of the zoom motor speed is introduced into the above expression will be described below.

Figure 7A:
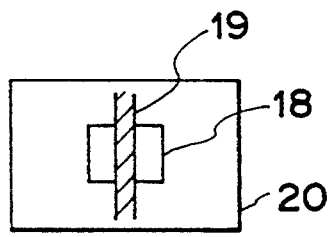
FIGS. 7A and 7B are views for explaining how to obtain the distance measuring area and the focus voltage within an image pickup screen.
Figure 7B:
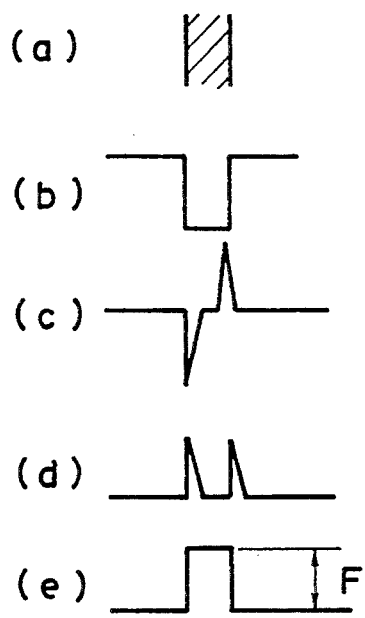
Figure 8:
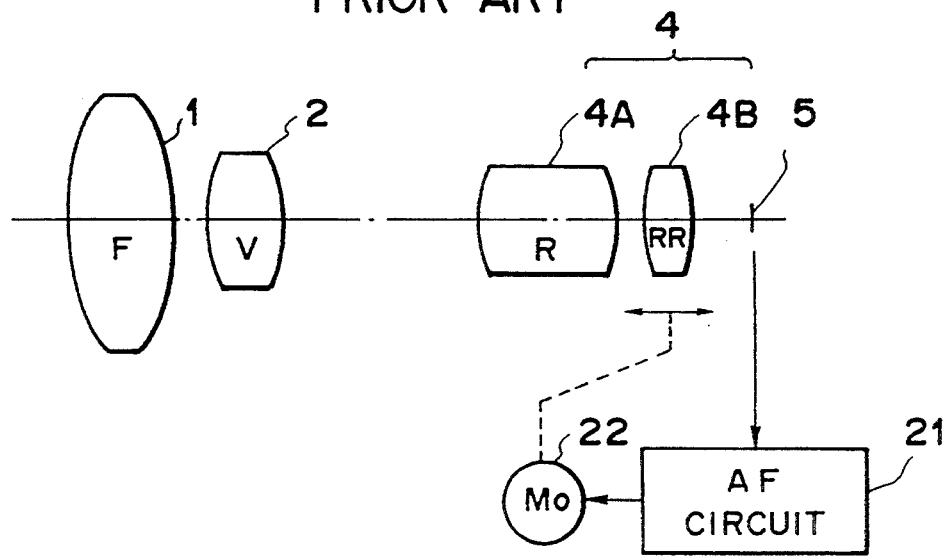
FIG. 8 is a block diagram showing an example of a camera of the rear focus lens type having an automatic focus adjusting device.

In carrying out the present invention, as previously described, where the value of $V_C$ is memorized for each of sub-divided small regions, and $V_C$ indicates the speed of focus motor, the practical calculation of $V_C$ is conducted as follows. The abscissa axis of FIGS. 7 and 9 is not a variator position (focal length), but can be replaced with the time axis under the assumption that the variator moves at a fixed rate. That is, the central point of region is indicated as (t,g) (t is the time required to reach a variator position when the wide end is assumed zero, and g is a focus lens position), and the focusing cam locus passing therethrough is f(t). Accordingly, if the differential value of f(t) is transformed on the pps order, $V_C$ in that region can be designated.

Therefore, in order to have the value of V so that the circle of confusion is changed at a constant rate even if the zoom speed changes, the value $X = t'z/tz$ where tz is a zoom speed on design and t'z is an actual zoom speed must be multiplied to $(V_C + F_{NO} \cdot K \cdot \Delta V_C)$. In doing this, it is necessary to know t'z. For detecting t'z, a method of predicting it by measuring the change of a volume encoder per unit time is conceived. In practice, the following methods can be provided.

① At the time of power-on, the zoom motor is actually moved a minute distance to calculate t'z and obtain X, and thereafter that value X is used.

② While the zoom operation is being performed, the changing speed of the encoder output is continuously measured to update t'z. For the correction, the newest X is used.

Since in the present invention it is especially required that the value of $V_C$ is correct during the zooming, the calculation of X is requisite.

Further, to get the value X calculated in the third embodiment more accurately, a stepping motor should be used as the zoom motor.

Figure 1:
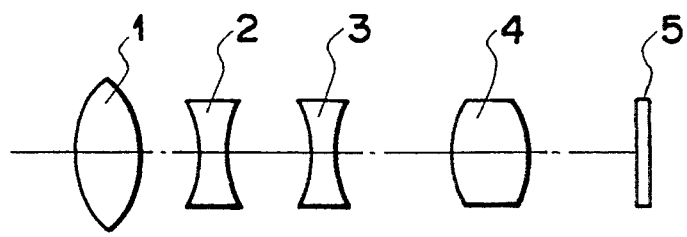
FIG. 1 is a view showing an example of a zoom lens for adjusting the focus by driving a front lens.
Figure 2:
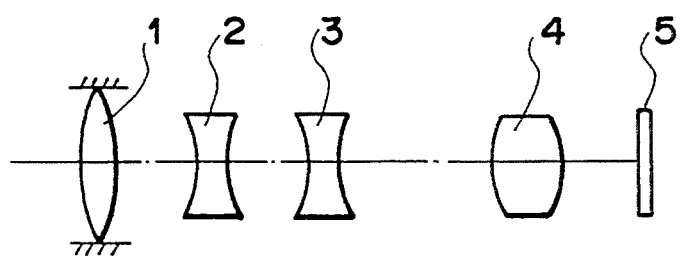
FIG. 2 is a view showing an example of a zoom lens of the rear focus (inner focus) type.
Figure 3:
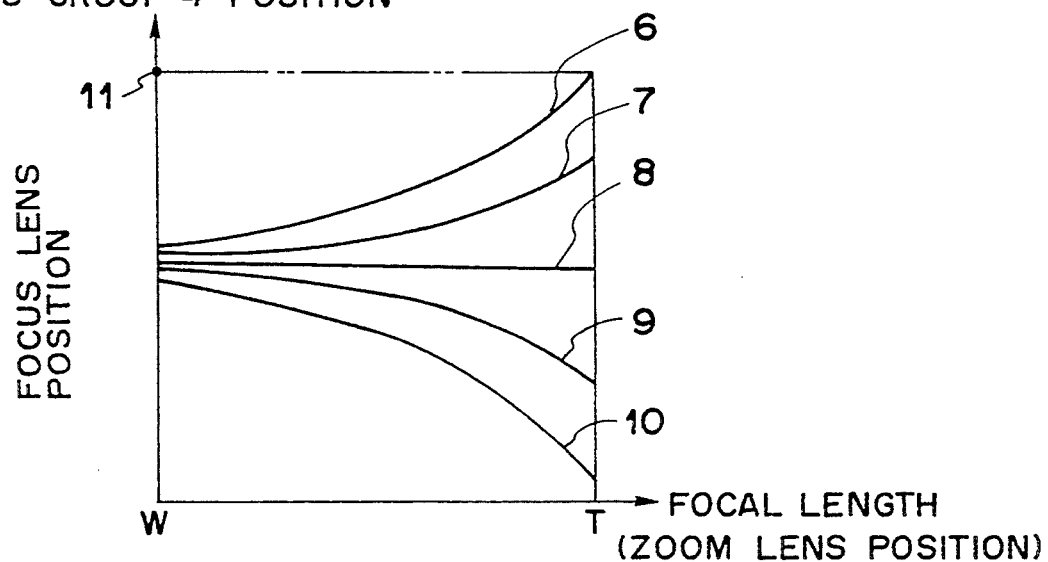
FIG. 3 is a characteristic diagram showing the locus of focusing position of a focus lens relative to the zoom position in a rear focus zoom lens as shown in FIG. 2.
Figure 5:
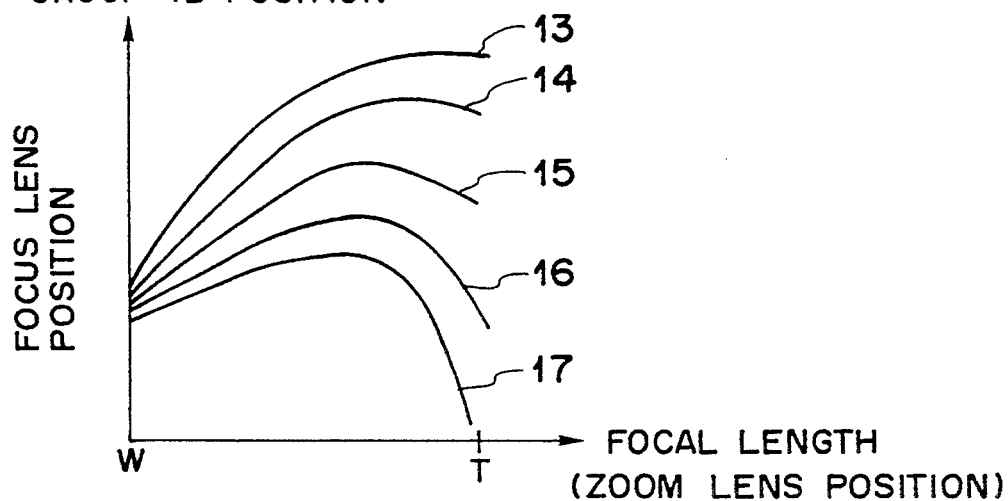
FIG. 5 is a characteristic diagram showing the locus of focusing position of a focus lens relative to the zoom position in a rear focus zoom lens as shown in FIG. 4.

In all the first to third embodiments, it is supposed that $V_C$ is used by reading out $V_C$ memorized for each of small regions as shown in FIG. 13, into which the map as shown in FIGS. 3 and 5 is subdivided, but a further method can be conceived in which cam locus 13, 14, 15 as shown in FIG. 9 are respectively memorized as the point (A/D value for the zoom encoder, stepping motor address) on the locus. In this case, $V_C$ is made equal to $\Delta y/\Delta t$ where $\Delta t$ is a time difference between the time when the current value of zoom encoder is first indicated and the time when one previous value of zoom encoder is first indicated, and $\Delta y$ is an address difference between the current address of stepping motor and the address of the stepping motor when one future value of zoom encoder is taken. In this case, since X is considered in $V_C$, the X correction for $V_C$ is unnecessary. (When X is desired to consider only in the correction term, $V = V_C + X \cdot F_{NO} \cdot K \cdot \Delta V_C$ may be used.)

As above described, according to the present invention, by determining the speed of focus motor for the inner focus lens with the expression $V = V_C + F_{NO} \cdot K \cdot \Delta V_C$ or $V = X \times (V_C + F_{NO} \cdot K \cdot \Delta V_C)$, there are following features, ① The speed determination algorithm for the focus motor during the zooming and at other times can be unified (if not zooming, $V_C = 0$).

② By changing the value K, more minute speed control can be made.

③ In consideration of the iris value $F_{NO}$, the speed setting can be easily made so that the rate of change in the circle of confusion is substantially constant regardless of $F_{NO}$. Particularly, when the fuzzy reasoning algorithm is combined, the item ② indicating the more minute speed control on various situations becomes effective.

As above described, since in the present invention the focus lens driving speed is determined based on a speed in which a reference speed determined by the positions of zoom lens and focus lens is corrected in accordance with the depth of field and the focusing state, it is possible to implement the driving of focus lens at an optimal speed corrected for various conditions of focusing such as the dispersion in the speed of zoom lens, depth of field, zoom lens position, front focus, rear focus, and degree of focusing, and in setting the focus lens moving speed during the zoom operation of inner focus lens, the more minute speed change suitable for the trial method is allowed, whereby it is possible to greatly improve the out of focus during the zoom operation of inner focus lens in a wide to tele direction, with a higher quality automatic focus adjustment, and realize the compactization, a reduced consumption power and a lower cost.

The fourth embodiment of the present invention will be described below.

This embodiment is also intended to prevent the out of focus during the zooming of inner focus type lens, and there is disclosed a lens control device comprising a zoom lens to be driven in the magnification changing operation, a focus lens for correcting the focus position which varies with the movement of the zoom lens or the change in the distance of object, focus detecting means for detecting the focus state, and control means for controlling the driving of the zoom lens in such a manner that if the focal state detected by the focus detecting means is not in a predetermined state, at the start of driving the zoom lens, the focus lens is driven to take the predetermined focal state, ahead of driving the zoom lens, wherein when the zoom operation is performed in the inner focus lens, the focus lens is first disposed near a predetermined end portion of rear focus or front focus before the movement of the zoom lens, and then the driving of zoom lens is started, whereby at the start of the zoom operation, the precision of detecting the direction of out of focus can be improved, and the focus lens is caused to correctly trace the focusing locus for allowing the focus lens to follow the zoom lens in the focusing state, resulting in the zoom operation being less out of focus.

Figure 6:
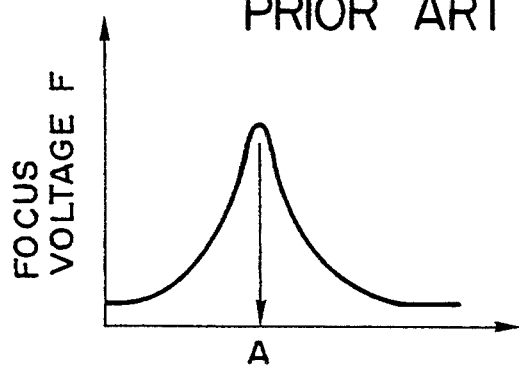
FIG. 6 is a characteristic diagram showing the relation between focus lens position and focus voltage.

That is, explaining this embodiment in contrast with the conventional arts, the relation between the lens position and the focus voltage (high frequency component of image pickup signal) representing the focus state is as shown in FIG. 6. In the figure, the direction of out of focus, when unfocused, i.e., front focus or rear focus, can be determined, depending on whether the lens is located to the left or the right of a position A.

In practice, there are known several methods for determining the direction of front focus or rear focus.

The first method is to move temporarily the lens group for the focus adjustment to either side, and determine the direction based on a variation of the focus voltage caused by that movement.

The second method is to oscillate minutely an image pickup element in an optical axis direction, using a piezoactuator for example, and determine the direction by examining the phase related with a variation in the focus voltage (for example, see Japanese Laid-Open Patent Application No. 3-41878).

The third method is to oscillate minutely the lens group itself for the actual focus adjustment like the second method, and determine the direction by moving the inner focus lens by using a stepping motor.

In the inner focus type lens, when the zooming is performed in a wide to tele direction, with the focusing state at the wide side, the zoom operation can be made with the focusing state retained by tracing on the locus according to the object distance, in the positional relation between the focal length and the lens group for the focus adjustment, as shown in FIGS. 3 and 5, but in practice, if the depth of field is taken into account, it is impossible to predict correctly the focusing position at the tele side from the absolute position of lens group for the focus adjustment in the focusing state at the wide side. This is because each locus converges in the wide end and diverges in the tele end, due to the depth of field. Accordingly, the possibility of maintaining the correct focusing point during the zooming in a wide to tele direction may be greatly governed by the correctness of rapidness in determining the direction of the front focus or rear focus as previously decribed.

With the second method as previously described, the correct and rapid direction determination can be made during or not during the zoom operation, because the image pickup element can be oscillated continuously regardless of the movement of focus lens, while in addition to an actuator for the drive of focus lens, an additional actuator for the oscillation of an image pickup element is required. Therefore, the second method is unfavorable in the respect of cost, size and reduction in power.

With the third method as previously described, it is possible to resolve the disadvantages associated with the first method because of the common utilization of the actuator, but in order to oscillate the lens moving on the focusing locus as shown in FIGS. 3 and 5, particularly during the zoom operation, the actuator for the drive of focus lens requires a more stringent specification such as the necessity of higher speed, whereby it is apprehended that the actuator becomes larger, causing a problem associated with the oscillation, noise, or the durability of the actuator and a lens interlock portion.

The first method is slightly inferior in the respect of correctness and rapidness in determining the direction, although the above problem can be resolved.

The method for preventing the out of focus from occurring during the zooming of inner focus lens has been described in a combination with an automatic focus adjusting device of the TTL type. However, in practice, it is quite difficult to remove the out of focus in zooming completely. For example, with an NTSC video camera, which makes the focus adjustment using a video signal, the period in which the distance measurement result takes place is at least 1/60 sec., during which time a steep inclination of focusing locus exceeding the permissible circle of confusion may be sufficiently conceived, particularly if the focus lens is stopped near the tele end.

Besides a combination with an automatic focus adjusting device of the TTL type, auxiliary means is known in which the relations of focusing locus as shown in FIGS. 3 and 5 are memorized within a control CPU in the form of an arithmetic expression or a data table, and the focus lens group is started to move so as to substantially trace on the focusing locus as shown in FIGS. 3 and 5, at the same time when the variator lens group is started to move, while the distance measurement result is obtained.

For example, in Japanese Laid-Open Patent Application No. 1-280709, a method has been disclosed in which taking the variator position in the abscissas axis and the focus lens position in the ordinate axis, the area as shown in FIGS. 3 and 5 is further subdivided into small regions, and at a central point of each region, a differential value of the focusing locus passing through that point is memorized, whereby the movement of variator lens and focus lens is started simultaneously based on the memory contents during the zooming.

In Japanese Laid-Open Patent Application No. 1-304411, another method has been disclosed in which the values of out of focus gradually becoming worse in the directions toward the rear focus and the front focus, in addition to the differential value for each small region, are memorized, and these three data are used properly to retain the focusing during the zooming.

In particular, there has been disclosed a measure in which at the start of the zooming, both motors are driven under the condition of yielding the out of focus in a direction of rear focus, and the unfocusing is considered as a rear focus at a stage where the automatic focus adjusting device issues an unfocusing judgment, after which the motor speed is corrected or selected.

In this way, in order not to cause the out of focus during the zooming of inner focus lens without the necessity of oscillating the focusing lens, or oscillating an image pickup element using another actuator, a method of alternately repeating the front focus and the rear focus in a range within the permissible circle of confusion has many advantages in terms of the cost, size, and other factors.

However, when the above method is used, there is no consideration about at which position the focus lens is stopped within the depth even if the focus lens position at the start of zooming lies within a range of focusing, whereby for example, when the zoom speed and the focus lens speed corresponding thereto are set at the start of zooming, so that the out of focus occurs in a direction of rear focus, it is apprehended that the rear focus state exceeding the permissible circle of confusion may arise before the automatic focus adjusting device detects the out of focus, where actual focus lens position is located at an end portion of the rear focus side.

In particular, during the zooming, various types of object information may be easily passed into or out of a signal acquirement range (distance measuring frame) for the automatic focus adjustment when the angle of view varies. Therefore, the focus voltage may abruptly decrease irrespective of approaching to the focusing, or vice versa. To prevent this effect to the utmost, it is contemplated that many focus voltage values in the past for each field as possible are memorized during the zooming, and by including the content of service speed at that time while the variation of focus voltage is being detected at the frequency of sign for example, the focusing or unfocusing, and the direction of out of focus are judged.

However, if the lens is further moved from an end portion of rear focus in a direction toward rear focus in this way, previous data itself during the zooming may be insufficient, resulting in an incorrect judgement.

Figure 14:
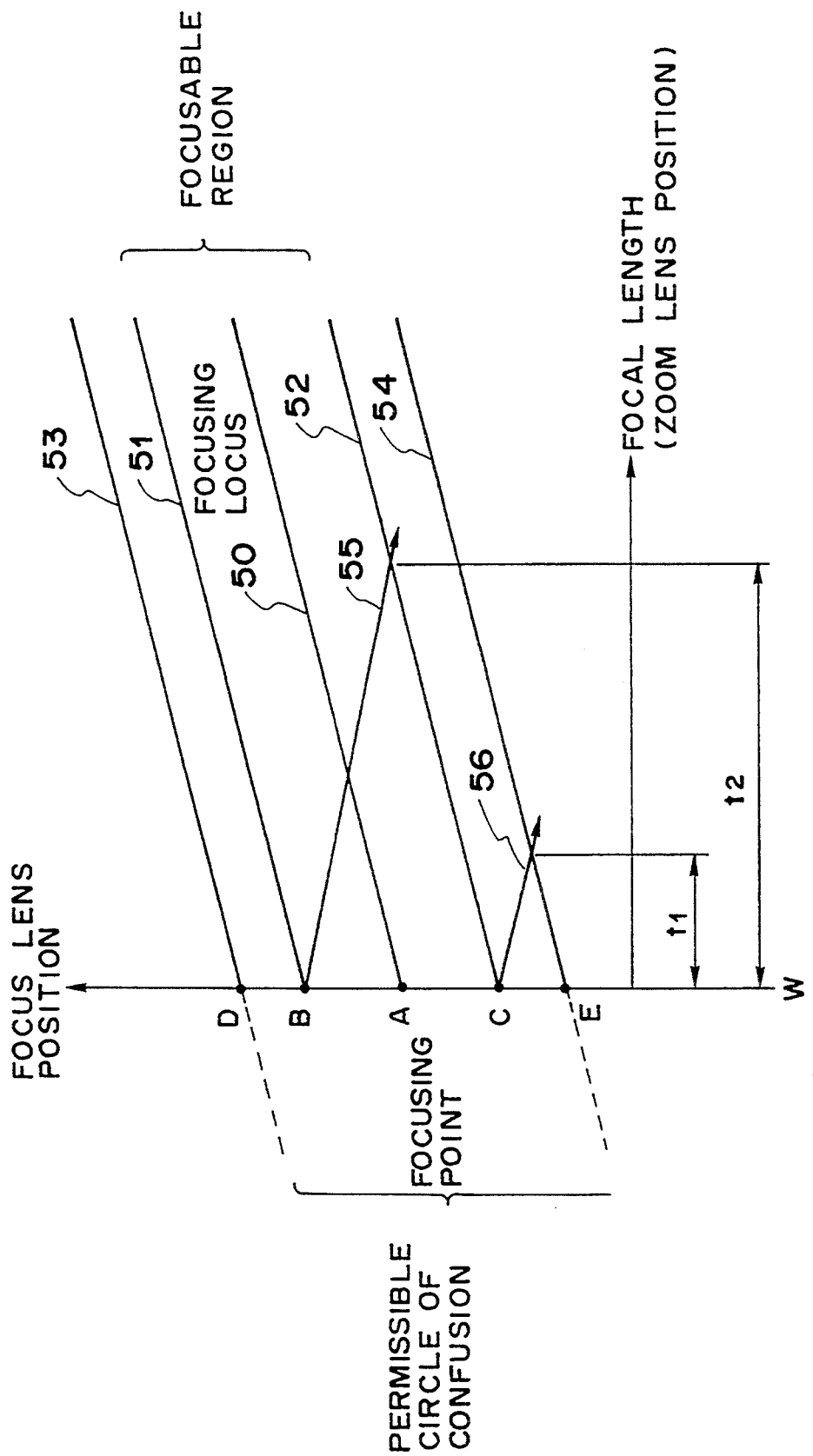
FIG. 14 is a view for explaining the focusing locus and the control of the zoom lens and the focus lens.

For example, when a point A of FIG. 14 is a true focusing position, and 50 is a focusing locus, the range surrounded by 51, 52 passing through point B and point C is a range considered as the focusing by the automatic focus adjusting device, that is, a range of depth, and 53, 54 are positions yielding the permissible circle of confusion for the focusing locus 50. For example, the meaning of driving in a direction toward the rear focus at the start of zooming is that the focus lens drive speed has an inclination as shown by a line 55 or 56 with respect to the focusing locus. Here, starting at a point C, a permissible circle of confusion will be produced after $t_1$ sec. On the other hand, starting at a point B, a range considered as the focusing by the automatic focus adjusting device will be passed through in $t_2$.

Examples of the variation in the focus voltage in which the lines 55, 56 starting at points C, B are supposed are shown in FIG. 15. 57 shows the variation for $t_1$ when starting at the point C.

Smoothing these information actually, the signal is on a curve 60, but it is difficult to determine the unfocusing from as few as 5 information containing noise.

On the contrary, when starting at the point B, the changing real value is shown as 58, wherein the form of a focusing locus can be more specifically presumed as the number of data given with the noise is greater as shown by 57. Therefore, it is expected that a judgment "unfocusing on the rear focus side" will be issued after $t_2$ sec.

That is, in the conventional art, in the property of out of focus at the start time of zooming, a difference will occur between starting the zooming at point B and point C, resulting in a significantly greater problem than as a video camera, the out of focus during the zoom operation may be dispersed depending on the photographing state.

This embodiment has been achieved to resolve the above problem, and there is disclosed a lens control device comprising a first lens group to be driven in the magnification changing operation, a second lens group for correcting the focus position which varies with the movement of the first lens group or the change in the object distance, focus detecting means for detecting the focal state, and control means for controlling the driving of the first lens group in such a manner that if the focal state detected by the focus detecting means is not placed in a predetermined state at the start of driving the first lens group, the second lens group is driven to take the predetermined focal state, ahead of driving the first lens group.

Also, there is disclosed a lens control device comprising a zoom lens for the magnification changing operation, a focus lens for correcting the focus position which varies with the movement of the zoom lens or the change in the object distance, focus detecting means for detecting the focal state, and control means for controlling the start of driving the zoom lens in such a manner as to drive only the focus lens, ahead of the zoom lens, at the start of driving the zoom lens, so as to transfer from the focusing state to a predetermined unfocused state based on an output of the focus detecting means, thereby determining the front focus or rear focus, and then to drive the zoom lens.

Thereby, at the zooming operation, before driving the zoom lens, the focus lens alone is first driven to transfer from the focusing state to a predetermined unfocused state, thereby determining whether its state is front focus or rear focus, and the zoom lens is then driven, whereby it is possible to prevent the out of focus from occurring immediately after the start of zooming, and to improve the precision of detecting the direction because of the ability of acquiring a great number of previous focus voltage values usable for the determination of focusing or unfocusing during the zoom operation.

In the following, the specific configuration and operation of this embodiment will be described. First, the system configuration including circuits is the same as that of the first embodiment as shown in FIG. 10, and this embodiment can be accomplished with the alteration of a control algorithm within the CPU 133. Of course, a combination thereof with the first embodiment is possible.

Figure 16:
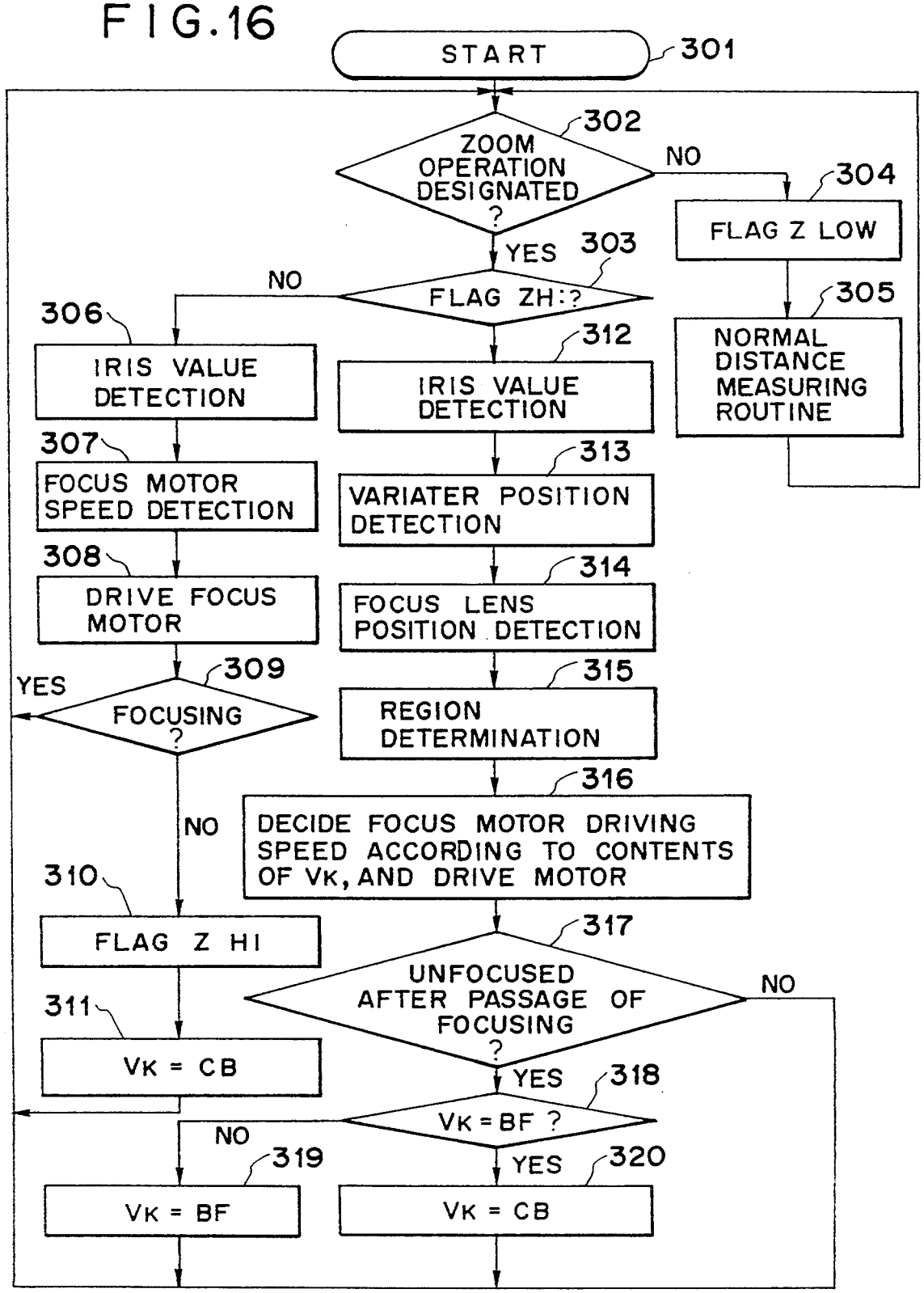
FIG. 16 is a flowchart showing a control algorithm of the focusing lens speed in a fourth embodiment of the present invention.

Next, the focus lens drive speed control operation of this embodiment by the use of a control program stored in the CPU 133 will be described in sequence in accordance with a flowchart as shown in FIG. 16.

At step 301, the control operation is started. At step 302, the state of a zoom switch 132 is detected to determine whether the zoom operation is performed or not. When the zoom operation is not performed, flag Z indicating the presence or absence of zoom operation is set low at step 304, and a normal distance measuring routine is entered.

In the normal distance measuring routine, there is no deviation of the focal plane according to the driving of zoom lens, because the zoom lens is left stopped, and in FIG. 5, at a zoom lens position on the transversal axis, the focus lens only moves in a longitudinal axis direction, and according to the focus state corresponding to a target object.

Accordingly, the CPU 133 controls the focus motor driver 126 based on a focus voltage among video signals detected by the AF device 122, and drives the focus motor 127 to move the focus lens 104B to a focusing point.

If the zoom operation is designated at step 302, the state of flag Z is determined at step 303. At the time when the zoom operation is started, flag Z is necessarily low. Accordingly, at the start of zooming, the procedure goes to step 306. At step 306, the iris value is detected. At step 307, the speed of moving the focus motor to an end portion of the depth before driving the zoom motor, which is a feature of the present invention, is calculated and determined in accordance with an iris value detected at step 306, i.e., the depth of field. At step 308, the lens is actually driven in either direction, based on an operation result at step 307. Then the feed-in drive is performed if the focus lens is disposed at an end portion of rear focus, or the feed-out drive is performed if it is disposed at an end portion of front focus. Herein, the focus lens is driven to the end portion of rear focus.

At step 309, the transfer from focusing to unfocusing with the movement of focus lens is judged. Since the zoom lens does not yet move, there occurs no movement of an object into or out of an acquirement range of distance measuring signal as previously described, so that the determination of unfocusing can be made relatively easily. Note that the unfocusing herein indicates a judgment of out of focus within the permissible circle of confusion, and as small as a least circle of confusion detectable by the automatic focus adjusting device.

Turning from focusing to unfocusing, flag Z is set high at step 310, and if as a result of driving at step 308, the end of rear focus is reached, the driving of the focus lens during the zoom operation is first conducted by correcting for the rear focus state, i.e., driving the focus lens to the front focus side. Herein, such setting is termed as $V_K=CB$. Note that conversely, in the front focus, such setting to correct for this is termed as $V_K=BF$.

Since the flag Z is set high at step 310, the procedure enters step 312 at a stage of coming again to step 303. The iris value, the zoom lens position and the focus lens position are detected at steps 312 to 314, and at step 315, the basis of aforementioned idea, the current region is determined among a plurality of small regions into which the map as shown in FIG. 5 is divided.

The driving contents of zoom motor and focus motor (either one may be also possible) according to $V_K$ are determined, based on a variety of data read from a ROM in which the speed data, the direction data, and the region data corresponding to the determined region are stored, to thereby drive them (step 316).

Thereafter, at step 317, unfocused state after passage of focusing locus 59 is detected as shown in FIG. 15. If the answer is yes at step 317, the content of $V_K$ is inverted at steps 318, 319 and 320 (CB for BF or BF for CB).

That is, if the zoom switch 132 is not operated with the above operation, the focus lens is driven, based on the focus voltage, whereby the normal automatic focus adjusting operation is performed.

When the zoom switch 132 is operated, the focus lens is first driven to the rear focus side by the AF device, whereby the transfer from the focusing state to the unfocusing state, i.e., the focus lens exceeding a focusing range 52 of FIG. 14, is detected from the focus voltage by the AF device, so that the focus lens has been surely moved to the end portion of the rear focus side. Thereby, the focus lens has the speed $V_K=CB$ set to correct for the rear focus or drive to the front focus side, whereby the operation is placed in a standby state for starting the zoom operation.

Subsequently if the zoom operation is performed, the zoom lens is driven at a predetermined speed, the positions of zoom lens and focus lens on the map of FIG. 5 are detected from the encoder information of the zoom lens and the focus lens, and the focus lens speed $V_M$ (or the follow-up speed to the zoom lens) corresponding to its position is read from a data table within the ROM, so that the focus lens is finally driven at a speed V in which $V_K=CB$ firstly set at step 311 is added thereto. That is, $V=V_M+V_K$.

Accordingly, the focus lens will follow the zoom lens while displacing at a speed component of $V_K=CB$ from an end portion of the focusing range on the rear focus side toward the front focus side (step 316).

If the AF device determines that the focus lens passes through a center of the focusing point to reach an end portion of front focus side in a moving direction, upon the detection of a transfer from focusing to unfocusing (step 217), $V_K=CB$ is inverted to a speed $V_K=BF$ for driving the focus lens to the rear focus side, whereby the focus lens is driven at a speed V in which $V_K$ is added to a speed $V_M$ at which the focus lens follows the zoom lens to trace on the focusing locus.

As above described, according to the present invention, the focus lens is controlled to move on a focusing locus by following the zoom lens while correcting the focus position by alternately moving to the end portions on the rear focus side and the front focus side within its focusable range, and at the start of zoom operation, the focus lens position is confirmed, in which if the focus lens is not located at a predetermined rear focus position or front focus position, the focus lens is moved to the predetermined position and the zoom lens is then driven, whereby it is possible to prevent assuredly any malfunction of causing the out of focus, as occurs with a case where the focus lens is already located at one end portion within the focusing range but further driven in the same direction to get out of the focusing locus, so that the zoom operation can be performed in such a manner that at the same time when the zoom lens is driven, the focus lens is driven alternately to the rear focus end and the front focus end at all times, without getting out of the focusing locus.

In the first embodiment as previously described, as means for driving the focus lens to the end portion of focusing range, there was provided a method of using the focus voltage of the AF device or the automatic focus detecting means.

The gist of the present invention is to position the focus lens in the rear focus or front focus state, and to start to drive the zoom lens from its state. Accordingly, the method for disposing firstly the focus lens to the depth end is such that if the iris value F at that time and the direction of driving the focus lens to the focusing are known, for example, it is possible to move the focus lens to a position "near the end portion on the rear focus side" even though that position is not an accurate end port ion.

Figure 17:
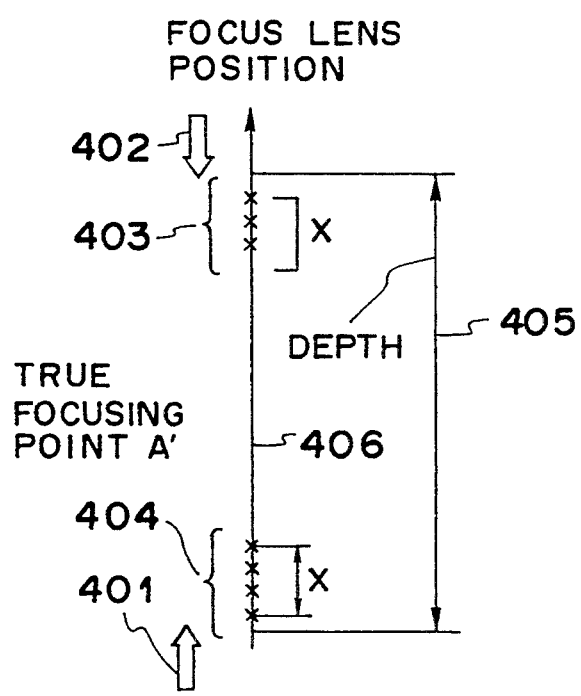
FIG. 17 is a view for explaining a fifth embodiment of the present invention.

This method will be described below as a second embodiment of the present invention. FIG. 17 is a view for explaining the principle of this method. Taking the focus lens position in a vertical direction in the same figure, A' point as indicated by 406 is a position 0 for the circle of confusion, which is a true focusing point. 405 is a range of the depth in which the automatic focus adjusting device can judge the focusing at this F value. In the same figure, the focus lens lies in the front focus state if it is located upward of the A' point, and in the rear focus state if it is located downward thereof. When the focus lens is moved from the front focus state in a direction of arrow 402, it is supposed that the lens is stopped in the vicinity of 403 as indicated by points x. Also, when the focus lens is moved from the rear focus state in a direction of arrow 401, the lens is stopped in the vicinity of 404 as indicated by points x.

Assuming the maximum width of the dispersion of stop position 403 and 404 to be X, and if the focus lens is moved from a direction of arrow 402 and stopped, at the initial time of starting the zoom operation, the focus lens is further moved from a position at which the focus lens is actually stopped in the direction of arrow 402 by the amount of "width of depth 405-X", so that the focus lens can be disposed substantially within a range of end portion X on the rear focus side. Conversely, when the zoom operation is performed after the focus lens is moved from a direction of arrow 401 and stopped (with a focusing signal issued), at the initial time of zoom operation, the focus lens is further moved in the same direction of arrow 401 by the amount of "width of depth 405-X", so that the focus lens can be disposed substantially at the end portion of front focus side.

If the focus lens has come to the focusing in a direction of arrow 410 and is required to dispose at the end portion of rear focus side, it is sufficient that the driving of zoom lens be started at its current position.

As above described, on the basis of the focus voltage of the automatic focus adjusting device, according to the fourth embodiment of the present invention, and the iris value (depth of focus) according to the fifth embodiment thereof, a method for disposing the focus lens group to the focusing has been described.

In practice, it is necessary to switch selectively those methods in accordance with the iris value F.

With the method of the fifth embodiment, what percent of the entire width of depth is occupied by the dispersion X of stop position is a key point of the extent that the focus lens position can be forwarded into the end portion of rear focus side or front focus side, i.e., the amount of out of focus. In determining the percentage (%), it is requisite to take into consideration the timing of obtaining the distance measuring result, the distance measuring cycle, and the inertia of motor which may have great effects thereon because the sensitivity becomes higher as the iris is more opened.

That is, since this percentage (%) is larger with a greater aperture of the iris and a less depth, it is apprehended that the focus lens position can not be sufficiently forwarded to the end portion of depth with the method of the fifth embodiment.

Accordingly, as the sixth embodiment, with a certain threshold for the iris value set, the methods as above described may be switched after and before the threshold. Since this can be sufficiently understood from the explanation of the fourth and fifth embodiments as above described, the description thereof is omitted.

As above described, according to the present invention, when the zoom operation is performed with the inner focus lens, the focus lens is disposed near a predetermined end portion of the rear focus or front focus before the movement of zoom lens, and then the driving of zoom lens is started, whereby the precision of detecting the direction of out of focus at the start of zoom operation can be improved, and the focus lens is allowed to correctly trace the focusing locus along which the focus lens can follow the zoom lens while in the focusing state, resulting in the zoom operation without out of focus.

Since the out of focus can be prevented from occurring from the initial time of zoom operation, the precision of detecting the direction can be also improved in acquiring and averaging many previous focus voltage values for the smoothing in the processing of focus voltage value.

What is claimed is:

1. A lens control device comprising:
    a zoom lens;
    a focus lens for correcting changes in a focus position due to movement of said zoom lens; and
    control means for driving said focus lens, based on a speed in which a reference speed determined by positions of zoom lens and focus lens is corrected in accordance with a depth of field and a focus state while the zoom lens is being driven.

2. The lens control device according to claim 1, wherein said control means is configured such that the moving speed V of said focus lens is operated by an expression $V = V_C + F_{NO} \times K \times \Delta V_c$, where $F_{NO}$ is information as to the depth of field, K is a coefficient concerning the focus state, $V_C$ is a reference speed determined by the positions of the zoom lens and the focus lens, and $\Delta V_C$ is a variation of the reference speed $V_C$.

3. The lens control device according to claim 1, wherein said control means calculates a correction speed with fuzzy reasoning.

4. The lens control device according to claim 2, wherein said control means calculates a correction speed with fuzzy reasoning.

5. The lens control device according to claim 2, wherein the reference speed $V_C$ is provided in a memory in advance with respect to each of a plurality of areas determined by different positions of the zoom lens and focus lens respectively, and wherein said control means reads out the $V_C$ corresponding to the area determined by the positions of the zoom lens and the focus lens.

6. The lens control device according to claim 1, wherein said control means simultaneously drives said zoom lens and said focus lens.

7. The lens control device according to claim 1, further comprising:
    image pickup means for photoelectrically converting an object image to output an image pickup signals and
    focus detection means for detecting the focus state by extracting a predetermined signal component from said image pickup signal output from said image pickup means.

8. The lens control device according to claim 7, wherein said predetermined signal component is information of an edge component Of an image corresponding to said image pickup signal.

9. The lens control device according to claim 2, wherein said depth of field $F_{NO}$ is calculated by detecting an iris value.

10. A lens control device comprising:
    a zoom lens;
    a focus lens for correcting changes in a focus position due to the movement of the zoom lens; and control means for driving the focus lens, based on a speed which is equal to zero while said zoom lens is not moved and equal to a reference speed determined by the positions of the zoom lens and the focus lens which is corrected in accordance with depth of field and focus state while the zoom lens is being driven.

11. The lens control device according to claim 10 characterized in that said control means is configured such that the moving speed V of said focus lens is operated by an expression $V = V_C + F_{NO} \times K \times \Delta V_C$, where $F_{NO}$ is information as to the depth of field, K is a coefficient concerning the focus state, $V_C$ is a reference speed determined by the positions of the zoom lens and the focus lens, and $\Delta V_C$ is a variation of the reference speed-$V_C$.

12. The lens control device according to claim 11 wherein said control means calculates a correction speed with fuzzy reasoning.

13. The lens control device according to claim 10, wherein said control means obtains said value "K" with fuzzy reasoning.

14. The lens control device according to claim 11, wherein the reference speed $V_C$ is provided in a memory in advance with respect to each of a plurality of areas determined by different positions of the zoom lens and focus lens respectively, and wherein said control means reads out the $V_C$ corresponding to the area determined by the positions of the zoom lens and focus lens.

15. The lens control device according to claim 10, further comprising:
   image pickup means for photoelectrically converting an object image to output an image pickup signal; and
   focus detection means for detecting a focus state by extracting a predetermined signal component from said image pickup signal output from said image pickup means.

16. The lens control device according to claim 15, wherein said predetermined signal component is information of an edge component of an image corresponding to said image pickup signal.

17. A lens control device comprising:
   a first lens group to be driven in a magnification changing operation;
   a second lens group for correcting a focus position which varies with movement of said first lens group or change in the object distance;
   focus detecting means for detecting focal state; and
   control means for controlling the magnification changing operation by said first lens group so as to detect the focal state by said focus detecting means when the control of the magnification changing operation is started and to drive said second lens group to obtain a predetermined focal state when the detected focal state is not the predetermined focal state.

18. The lens control device according to claim 17, wherein said first lens group is a magnification lens and said second lens group is a focus lens.

19. The lens control device according to claim 18, wherein said control means determines driving speed characteristic of the focus lens according to positions of the magnification lens and the focus lens when the magnification lens is driven.

20. The lens control device according to claim 19, wherein said driving speed characteristic of the focus determines a driving-speed of the focus lens so as to maintain the focal state when said magnification lens is driven and said driving speed characteristic is stored in a memory as a plurality of driving speed characteristic curves each corresponding to the object distance, and wherein said control means selects corresponding one of the driving speed characteristic curves stored in said memory based on the positions of the magnification lens and the focus lens.

21. The lens control device according to claim 20, wherein said control means causes said focus lens to trace the selected driving speed characteristic curve by moving said focus lens alternately to front focus side and rear focus side when said magnification lens is driven.

22. The lens control device according to claim 21, wherein said control means causes said focus lens to trace the selected driving speed characteristic curve by moving said focus lens alternately to the front focus side and the rear focus side within the depth of field when said magnification lens is driven.

23. The lens control device according to claim 22, wherein said control means inverts a driving direction of said focus lens with respect to the selected driving speed characteristic curve by detecting that said focus lens crosses the selected driving speed characteristic curve when said magnification lens is driven.

24. The lens control device according to claim 23, wherein said control means detects that said focus lens crosses the selected driving speed characteristic curve, based on change from an in-focus state to a defocusing state.

25. The lens control device according to claim 22, wherein a correction speed with which said focus lens is moved to the front focus side and the rear focus side with respect to the driving speed characteristic curve, is calculated based on the depth of field and the driving speed of said focus lens is corrected by adding said correction speed to a focus lens driving speed determined by the driving speed characteristic curve.

26. A lens control device characterized by comprising:
   a zoom lens for performing a magnification changing operation;
   a focus lens for correcting changes in a focus position which varies with the movement of said zoom lens or the change in the object distance;
   focus detecting means for detecting focal state; and
   control means for controlling the magnification changing operation by said zoom lens so as to drive only said focus lens ahead of said zoom lens to transfer from an in-focus state to a predetermined out of focus state based on an output of said focus detecting means, thereby determining whether the focusing state is front focus or rear focus, and then to drive the zoom lens.

27. The lens control device according to claim 26, wherein said control means determines driving speed characteristic of the focus lens according to positions of the zoom lens and focus lens when the zoom lens is driven.

28. The lens control device according to claim 27, wherein said-driving speed characteristic of the focus lens determines a driving speed of the focus lens so as to maintain the focal state when said zoom lens is driven and said driving speed characteristic is stored in a memory as a plurality of driving speed characteristic curves each corresponding to the object distance, and wherein said control means selects a corresponding one of the driving speed characteristic curves stored in said memory based on the positions of the zoom lens and focus the lens.

29. The lens control device according to claim 28, wherein said control means causes said focus lens to trace the selected driving speed characteristic curve by moving said focus lens alternately to a front focus side and a rear focus-side within the depth of field when said zoom lens is driven.

30. The lens control device according to claim 29, wherein said control means inverts driving direction of said focus lens with respect to the selected driving speed characteristic curve by detecting that said focus lens crosses the selected driving speed characteristic curve when said zoom lens is driven.

31. The lens control device according to claim 30, wherein a correction speed with which said focus lens is moved to the front focus side and the rear focus side with respect to the driving speed characteristic curve, is calculated based on the depth of field and the driving speed of said focus lens is corrected by adding said correction speed to a focus lens driving speed determined by the driving speed characteristic curve.

32. An optical apparatus comprising:
first optical means;
second optical means for correcting change of an optical state caused by moving of said first optical means;
memory means for storing a plurality of reference control information corresponding to position information of said first optical means and said second optical means;
first correction means for driving said second optical means by selecting the corresponding reference control information from said memory means based on the position information of said first optical means and said second optical means and for correcting the change of the optical state caused by moving of said first optical means; and
second correction means for correcting the reference control information by a fuzzy reasoning operation using a predetermined signal component which changes according to the optical state.

33. An apparatus according to claim 31, wherein said first optical means is a zoom lens and said second optical means is a focus lens.

34. An apparatus according to claim 33, wherein said memory means stores a plurality of driving speed characteristic curves each of which corresponds to object distance and determines the driving speed $V_C$ of said focus lens to maintain an in-focus state when said zoom lens is driven, and wherein said first correction means selects the driving speed characteristic curve corresponding to the positions of said zoom lens and said focus lens, as the reference control information.

35. An apparatus according to claim 34, wherein said second correction means corrects said driving speed $V_C$ of the reference control information by performing the fuzzy reasoning operation using the predetermined signal component which changes according to the optical state.

36. An apparatus according to claim 35, wherein said second correction means corrects the driving speed $V_C$ by using a correction speed which is provided by multiplying changing amount $\Delta V_C$ of the driving speed $V_C$ by depth of field $F_{NO}$ and coefficient K.

37. An apparatus according to claim 36, wherein said second correction means calculates the coefficient K by fuzzy reasoning.

38. A camera comprising:
a zoom lens;
a focus lens for correcting change of a focal position caused by moving of said zoom lens;
memory means for storing a plurality of reference speed information corresponding to positions of said zoom lens and said focus lens;
control means for driving said focus lens by selecting an appropriate reference speed from said memory means based on information on the positions of said zoom lens and said focus lens and for correcting the change of the focal position caused by moving said zoom lens; and
correction means for correcting said reference speed by performing a fuzzy reasoning operation using a predetermined signal component which changes according to a focal state.

39. A camera according to claim 38, wherein said memory means stores a plurality of driving speed characteristic curves each of which corresponds to object distance and determines the driving speed $V_C$ of said focus lens to maintain an in-focus state when said zoom lens is driven, and wherein said control means selects the driving speed characteristic curve corresponding to the positions of said zoom lens and said focus lens, as the reference control information.

40. A camera according to claim 39, wherein said correction means corrects said driving speed $V_C$ of the reference control information by performing a fuzzy reasoning operation using the predetermined signal component which changes according to the optical state.

41. A camera according to claim 40, wherein said correction means corrects the driving speed $V_C$ by using a correction speed which is provided by multiplying changing amount $V_C$ of the driving speed $V_C$ by depth of field $F_{NO}$ and a coefficient K.

42. A camera according to claim 41, wherein said correction means calculates the coefficient K by the fuzzy reasoning.

43. A camera according to claim 38, further comprising:
image pickup means for photoelectrically converting an
focus detecting means for detecting a focal state by extracting a high frequency component which changes in accordance with the focal state from said image pickup signal output from said image pickup means, and wherein said correction means corrects the reference speed based on the output of said focus detection means.

44. A camera comprising:
a lens;
memory means for storing a predetermined characteristic for driving said lens while maintaining a predetermined optical state;
control means for driving said lens according to said predetermined characteristic read out from said memory means; and
correction means for correcting a driving speed of said lens by performing a fuzzy reasoning operation by detecting a predetermined signal component which changes according to said optical state.

45. A camera according to claim 44, wherein said lens includes a zoom lens and a focus lens, wherein said memory stores a plurality of driving speed characteristic curves each of which corresponds to object distance and determines the driving speed $V_C$ of said focus lens to maintain an in-focus state when said zoom lens is driven, and wherein said control means selects the driving speed characteristic curve corresponding to the positions. of said zoom lens and said focus lens, as said driving speed of said lens.

46. A camera according to claim 45, wherein said correction means corrects said driving speed $V_C$ of the driving speed of said lens by performing the fuzzy reasoning operation using said predetermined signal component which changes according to the optical state.

47. A camera according to claim, 46 wherein said correction means corrects the driving speed $V_C$ by using a correction speed which is provided by multiplying-changing amount $V_C$ of the driving speed $V_C$ by depth of field $F_{NO}$ and a coefficient K and said correction means calculates the coefficient K by the fuzzy reasoning.

48. A camera according to claim 47, further comprising:
image pickup means for photoelectrically converting an object image to output an image pickup signal; and
focus detecting means for detecting a focal state by extracting a high frequency component which changes in accordance with the focal state from said image pickup signal output from said image pickup means, and wherein said correction means corrects the driving speed of said lens based on the output of said focus detection means.

49. A lens control apparatus comprising:
(A) a zoom lens group;
(B) a focus lens for correcting a focal position which varies with movement of said zoom lens group;
(C) memory means for storing a plurality of control information corresponding to position information of said zoom lens group and focus lens group; and
(D) control means for driving said focus lens group on the basis of said control information read out from said memory means and correcting the control information according to a focus condition and a depth of field.

50. An apparatus according to claim 49, wherein said control means is configured such that a moving speed V of said focus lens group is operated by an expression $V = V_C + F_{NO} \times K \times \Delta V_C$, where $F_{NO}$ is information as to the depth of field, K is a coefficient concerning the focus state, $V_C$ is a reference speed determined by the positions of the zoom lens and the focus lens, and $\Delta V_C$ is the variation of the reference speed $V_C$.

51. The lens control apparatus according to claim 49, wherein said control means calculates a correction speed with fuzzy reasoning.

52. An apparatus according to claim 50, wherein the reference speed $V_C$ is provided in said memory means with advance with respect to each of a plurality of areas determined by different positions of the zoom lens group and the focus lens group respectively, and wherein said control means reads out the $V_C$ corresponding to the area determined by the positions of the zoom lens group and the focus lens group.

53. An apparatus according to claim 49, further comprising:
image pickup means for photoelectrically converting an object image to output an image pickup signal; and
focus detection means for detecting the focus state by extracting a predetermined signal component from said image pickup signal output from said image pickup means.

54. An apparatus according to claim 50, wherein said depth of field $F_{NO}$ is calculated by detecting an iris value.

55. A video camera apparatus comprising:
(A) a zoom lens group;
(B) a focus lens for correcting a focal position which varies with movement of said zoom lens group;
(C) memory means for storing a plurality of control information corresponding to position information of said zoom lens group and focus lens group;
(D) focus detecting means for detecting a focus condition;
(E) detecting means for detecting a depth of field; and
(F) control means for driving said focus lens group on the basis of the control information read out from said memory means and correcting the control information by a fuzzy reasoning operation using the focus condition detected by said focus detecting means and the depth of field detected by said detecting means during said zoom lens group is being driven.

56. An apparatus according to claim 55, wherein said control means operates a moving speed V of said focus lens group, said moving speed V being expressed by $V = V_C + F_{NO} \times K \times \Delta V_C$, where $F_{NO}$ is information as to the depth of field, K is a coefficient concerning the focus state, $V_C$ is a reference speed determined by the positions of the zoom lens group and the focus lens, and $\Delta V_C$ is a variation of the reference speed $V_C$.

57. An apparatus according to claim 56, wherein the reference speed $V_C$ is provided in said memory means in advance with respect to each of a plurality of areas determined by different positions of the zoom lens group and focus lens respectively, and wherein said control means reads out the $V_C$ corresponding to the area determined by the positions of the zoom lens group and the focus lens.

58. An apparatus according to claim 56, wherein said control means operates a correction speed and/or the coefficient K with fuzzy reasoning.

59. An apparatus according to claim 55, further comprising:
image pickup means for photoelectrically converting an object image to output an image pickup signal; and
focus detection means for detecting the focus state by extracting a predetermined signal component from said image pickup signal output from said image pickup means.

60. A lens control apparatus comprising:
(A) a zoom lens group;
(B) a focus lens for correcting a focal position which varies with movement of said zoom lens group;
(C) an iris;
(D) memory means for storing a plurality of control information corresponding to position information of said zoom lens group and focus lens group; and
(E) control means for controlling a position of said focus lens group on the basis of said control information read out from said memory means and correcting the position of said focus lens group according to a focus condition and depth of field detected based on a value of said iris.

61. An apparatus according to claim 60, wherein said control means operates a moving speed V of said focus lens group, said moving speed V being expressed by $V = V_C + F_{NO} \times K \times \Delta V_C$, where $F_{NO}$ is information as to the depth of field, K is a coefficient concerning the focus state, $V_C$ is a reference speed determined by the positions of the zoom lens group and the focus lens, and $\Delta V_C$ is a variation of the reference speed $V_C$.

62. An apparatus according to claim 60, wherein said control means operates a correction speed with fuzzy reasoning.

63. An apparatus according to claim 61, wherein said reference speed $V_C$ is provided in said memory means in advance with respect to each of a plurality of areas determined by different positions of the zoom lens group and focus lens respectively, and wherein said control means reads out the reference speed $V_C$ corresponding to the area determined by the positions of the zoom lens group and focus lens.

64. An apparatus according to claim 61, wherein said $F_{NO}$ is the value of said iris.

65. A video camera apparatus comprising:
    (A) a zoom lens group;
    (B) a focus lens for correcting a focal position which varies with movement of said zoom lens group;
    (C) memory means for storing a plurality of control information corresponding to position information of said zoom lens group and focus lens group;
    (D) focus detecting means for detecting a focus condition;
    (E) detecting means for detecting a depth of field; and
    (F) control means for controlling a moving position of said focus lens group on the basis of the control information read out from said memory means and correcting the moving position of said focus lens group by a fuzzy reasoning operation using the focus condition detected by said focus detecting means and the depth of field detected by said detecting means during said zoom lens group is being driven.

66. An apparatus according to claim 65, wherein said control means operates a moving speed V of said focus lens group, said moving speed V being expressed by $V = V_C + F_{NO} \times K \times \Delta V_C$, where $F_{NO}$ is information as to the depth of field, K is a coefficient concerning the focus state, $V_C$ is a reference speed determined by the positions of the zoom lens group and the focus lens, and $\Delta V_C$ is a variation of the reference speed $V_C$.

67. An apparatus according to claim 66, wherein the reference speed $V_C$ is provided in said memory means in advance with respect to each of a plurality of areas determined by different positions of the zoom lens group and focus lens respectively, and wherein said control means reads out the $V_C$ corresponding to the area determined by the positions of the zoom lens group and the focus lens.

68. An apparatus according to claim 66, wherein said control means operating a correction speed and/or the coefficient K with fuzzy reasoning.

69. An apparatus according to claim 65, further comprising:
    image pickup means for photoelectrically converting an object image to output an image pickup signal; and
    focus detection means for detecting the focus state by extracting a predetermined signal component from said image pickup signal output from said image pickup means.

* * * * *

UNITED STATES PATENT AND TRADEMARK OFFICE
CERTIFICATE OF CORRECTION

PATENT NO. : 5,438,190
DATED : August 1, 1995          Page 1 of 2
INVENTOR(S) : Naoya Kaneda et al.

It is certified that error appears in the above-indentified patent and that said Letters Patent is hereby corrected as shown below:

Cover page, Item [54]. After "LENS" insert -- MOVING SPEED -- and after "DEVICE" insert -- FOR USE WITH AN IMAGE PICKUP DEVICE --.

Col. 1, line 2. After "LENS" insert -- MOVING SPEED -- and after "DEVICE" insert -- FOR USE WITH AN IMAGE PICKUP DEVICE --.

Col. 2, line 41. Change "sas" to -- sa --.

Col. 3, line 15. Change "abscissas" to -- abscissa --.

Col. 3, line 46. Change "abscissas" to -- abscissa --.

Col. 3, line 47. Change "ordinates" to -- ordinate --.

Col. 3, line 50. Change "abscissas" to -- abscissa --.

Col. 5, line 45. Change "minuter" to -- more minute --.

Col. 5, line 50. Change "photographying" to -- photographing --.

Col. 6, line 67. Change "abscissas" to -- abscissa --.

Col. 6, line 68. Change "ordinates" to -- ordinate --.

Col. 7, line 5. Delete "is".

Col. 13, line 19. Change "6" to -- $\phi$ --.

Col. 16, line 41. Change "abscissas" to -- abscissa --.

Col. 20, line 61. Change "port ion" to -- portion --.

UNITED STATES PATENT AND TRADEMARK OFFICE
CERTIFICATE OF CORRECTION

PATENT NO. : 5,438,190
DATED : August 1, 1995   Page 2 of 2
INVENTOR(S) : Naoya Kaneda et al.

It is certified that error appears in the above-indentified patent and that said Letters Patent is hereby corrected as shown below:

Col. 22, line 57.  Change "Of" to -- of --.

Col. 23, line 8.  Change "☐" to -- Δ --.

Col. 24, line 59.  Delete "-".

Col. 25, line 36.  Delete "-".

Col. 26, line 42.  After "an" insert -- object image to output an image pickup signal; and --.

Col. 27, line 2.  Delete ".".

Col. 27, line 12.  Delete "-".

Signed and Sealed this

Twenty-third Day of January, 1996

Attest:

BRUCE LEHMAN

*Attesting Officer*   *Commissioner of Patents and Trademarks*